US006744806B1

(12) United States Patent
Moore et al.

(10) Patent No.: US 6,744,806 B1
(45) Date of Patent: Jun. 1, 2004

(54) FAST-SYNCHRONIZING HIGH-FIDELITY SPREAD-SPECTRUM RECEIVER

(75) Inventors: Michael Roy Moore, Corryton, TN (US); Stephen Fulton Smith, Loudon, TN (US); Michael Steven Emery, Powell, TN (US)

(73) Assignee: UT-Battelle, L.L.C., Oak Ridge, TN (US)

( * ) Notice: Subject to any disclaimer, the term of this patent is extended or adjusted under 35 U.S.C. 154(b) by 572 days.

(21) Appl. No.: 09/660,743

(22) Filed: Sep. 13, 2000

(51) Int. Cl.[7] .................................................. H04B 1/69

(52) U.S. Cl. ....................................... 375/130; 375/136

(58) Field of Search ........................ 375/240.02, 240.04, 375/240.05, 240.06, 229, 233, 232, 350, 130, 136, 137, 145, 149; 370/320, 335, 342, 441

(56) References Cited

U.S. PATENT DOCUMENTS 4,017,798 A 4/1977 Gordy et al.
4,530,103 A 7/1985 Mosley, Jr. et al.
4,744,094 A 5/1988 McCarren
4,894,842 A 1/1990 Broekhoven et al.
4,965,759 A 10/1990 Uchida et al.
5,216,691 A 6/1993 Kaufmann
5,402,445 A 3/1995 Matsuura
5,444,739 A 8/1995 Uesugi et al.
5,563,911 A 10/1996 Uesugi et al.
5,692,006 A * 11/1997 Ross .......................... 375/147
5,774,494 A 6/1998 Sawahashi et al.
5,778,055 A * 7/1998 Paneth et al. ............ 379/93.31
5,903,593 A 5/1999 Ishiguro et al.
6,175,588 B1 * 1/2001 Visotsky et al. ............ 375/148
6,240,133 B1 * 5/2001 Sommer et al. ............ 375/232
6,438,156 B1 * 8/2002 Ghobrial et al. ............ 375/148
6,522,683 B1 * 2/2003 Smee et al. ................. 375/144
6,545,990 B1 * 4/2003 Amalfitano et al. ........ 370/335

FOREIGN PATENT DOCUMENTS

WO PCT/F194/00503 5/1995
WO PCT/US99/00851 9/1999

OTHER PUBLICATIONS

International Search Report re PCT/US01/28945, Apr. 25, 2002.

XP10109930A Giallorenzi, et al. "Decision Feedback Multiuser Receivers for Asynchronous CDMA Systems", Department of Electrical Engineering, University of Virginia, pp. 1677–1682, Nov. 29, 1993.

* cited by examiner

*Primary Examiner*—Emmanuel Bayard
(74) *Attorney, Agent, or Firm*—Gray Cary Ware & Freidenrich LLP

(57) ABSTRACT

A fast-synchronizing receiver having a circuit including an equalizer configured for manipulating an analog signal; a detector in communication with the equalizer; a filter in communication with the detector; an oscillator in communication with the filter; a gate for receiving the manipulated signal; a circuit portion for synchronizing and tracking the manipulated signal; a summing circuit in communication with the circuit portion; and an output gate.

43 Claims, 18 Drawing Sheets

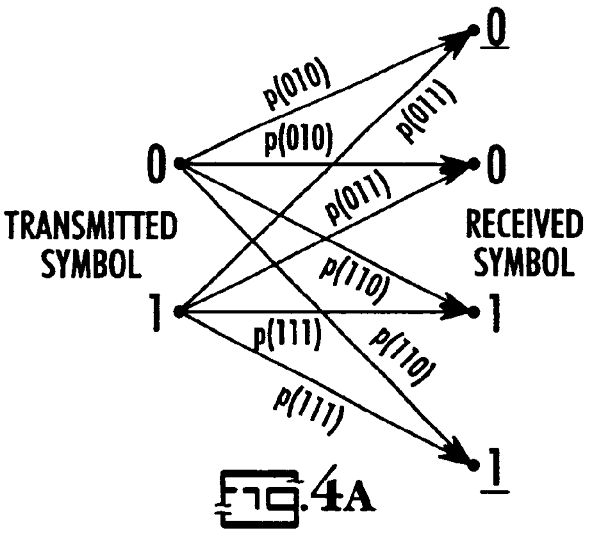
FIG. 4A
| $p(r\|y)$ | $r=\underline{0}$ | 0 | 1 | $\underline{1}$ |
|---|---|---|---|---|
| $y=0$ | 0.50 | 0.32 | 0.13 | 0.05 |
| $y=1$ | 0.05 | 0.13 | 0.32 | 0.50 |
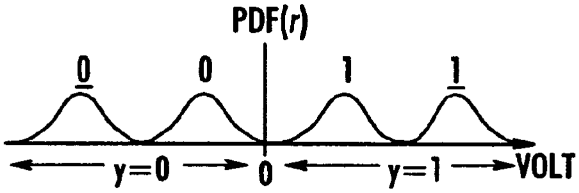
FIG. 4B
| $\log_3 p(r\|y)$ | $r=\underline{0}$ | 0 | 1 | $\underline{1}$ |
|---|---|---|---|---|
| $y=0$ | -1.00 | -1.62 | -2.94 | -4.32 |
| $y=1$ | -4.32 | -2.94 | -1.62 | -1.00 |
FIG. 4C
$$M(r\ y) \sim 1.5[\log_3 p(r\ y) = \log_3(0.05)]$$
| $M(r\|y)$ | $r=\underline{0}$ | 0 | 1 | $\underline{1}$ |
|---|---|---|---|---|
| $y=0$ | 5 | 4 | 2 | 0 |
| $y=1$ | 0 | 2 | 4 | 5 |
FIG. 4D FIG. 5G
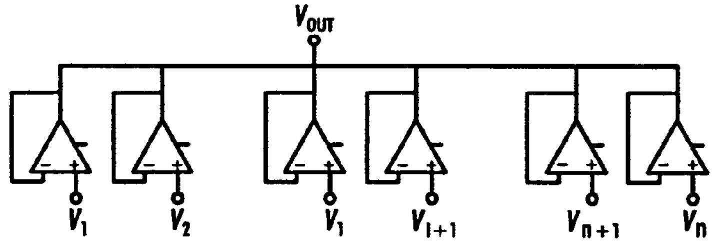
FIG. 5H
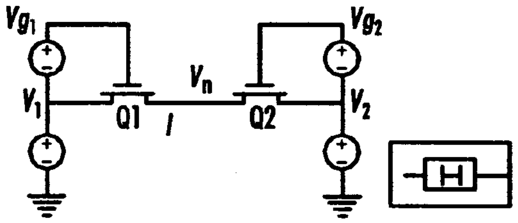
FIG. 5I
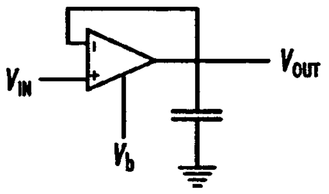
FIG. 5J
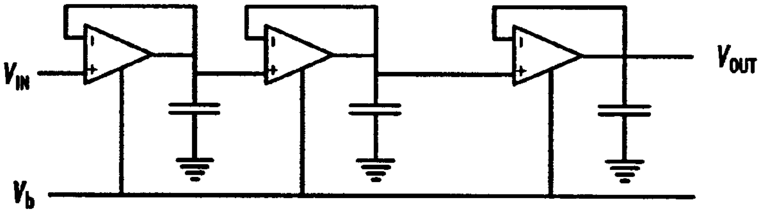
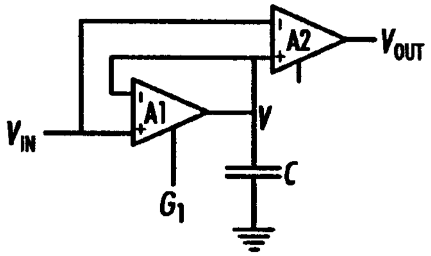
FIG. 5K
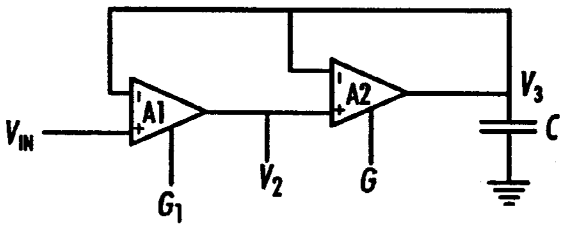
FIG. 5L

FAST-SYNCHRONIZING HIGH-FIDELITY SPREAD-SPECTRUM RECEIVER

STATEMENT AS TO RIGHTS TO INVENTIONS MADE UNDER FEDERALLY-SPONSORED RESEARCH AND DEVELOPMENT

This invention was made with United States Government support awarded by the United States Department of Energy under prime contract No. DE-AC05-00OR22725 to UT-Battelle, LLC. The United States Government has certain rights in this invention.

FIELD OF THE INVENTION

The present invention relates generally to digital-data receivers, and particularly to a channel-adaptive high-fidelity receiver for quickly synchronizing to a spread-spectrum signal.

BACKGROUND OF THE INVENTION

Reliable, affordable communications is an essential component in any communication system. Spread-spectrum systems offer the flexibility of immediate (domestic) license-free operation in four distinct frequency bands (902–928 MHz, 2400–2483.5 MHz, 5150–5350, and 5725–5850 MHz) and can be deployed in several other bands to accommodate high data rates concurrently with high link integrity (low error rates), even in the presence of significant multipath effects and interfering signals. Two difficult but frequently encountered scenarios are the indoor and urban/suburban mobile radio environments; the typical multipath delay spreads range from 10 to 250 ns in the former case and 2 to 100 $\mu$s in the latter (corresponding to 70% coherence-bandwidth ranges of 0.25–6 MHz and 0.6–30 kHz, respectively). This patent discloses additional advanced signal-processing methods tailored for spread-spectrum reception systems, but in some cases useful for non-spread systems as well, which support improved multipath-rejection capabilities for difficult applications (e.g., highly reflective environments or non-line-of-sight links), faster and more efficient synchronization, and improved tracking of spread-spectrum signals in dynamic environments.

A typical spread-spectrum receiver block diagram is shown in FIG. 1. The modulated signal enters the low-noise amplifier (LNA) via an antenna. This RF signal is then down-converted to a baseband signal using one or more mixing stages and corresponding local oscillators (LOs). The phase-locked loop (PLL) is necessary to fine-tune the LO(s) to the incoming RF signal. After filtering, the baseband signal enters a group of $2^N-1$ shift registers. (In some applications 2 sets of $(2^N-1)$-length shift registers are used to improve correlation.) A parallel group of shift registers is loaded with a local copy of the spread spectrum code. The outputs of the two parallel groups of shift registers are exclusive-ORed together (single adder). The outputs of all the exclusive-ORs are summed, indicating the number of positions in which the two bit streams match or "agree".

When the number of bit agreements exceeds a preset threshold, the signal is determined to be synchronized. The circuitry then tracks the incoming signal by making small adjustments to the frequencies and/or phases of the clock signals. The output of the bit-decision block is the baseband (despread) output data stream.

The number of mathematical operations required to synchronize the receiver correlator circuits to the typical spread-spectrum signal limits the practical range spreading-code lengths. Further, the number of operations also has a strong effect on the cost and complexity of the associated hardware. The novel synchronization approach contained in the instant invention reduces the time and hardware need to synchronize to a spread-spectrum signal and additionally facilitates direct down-conversion of the incoming RF signal to baseband, which in turn can alleviate the need for an intermediate-frequency (IF) stage in the receiver chain. This feature of the present approach can even further reduce receiver hardware complexity compared with the existing systems.

The art is replete with spread-spectrum receivers. For instance, U.S. Pat. No. 4,965,759 to Uchida et al. discloses a spread-spectrum receiver comprising a correlation pulse generator and associated circuitry for comparing peak values and thresholds based on those peak values to generate a correlation pulse. A similar approach using analog matched filters and a phase-dithered local-oscillator technique is shown in U.S. Pat. No. 4,017,798 to Gordy et al.

U.S. Pat. No. 5,216,691 to Kaufmann discloses a spread-spectrum receiver containing a bank of time-integrating correlators for correction of a received signal with a reference code and a downstream digital signal processor for evaluating results of the correlations. The resulting processed output approximately compensates for the multipath signal components produced by the terrestrial RF channel.

U.S. Pat. No. 5,774,494 to Sawahashi et al. discloses a frequency-error correction device for a spread-spectrum receiver which corrects a frequency error between a transmitter and receiver in a baseband signal range, thus obviating the need for a highly-accurate, highly-stable voltage-controlled oscillator.

U.S. Pat. No. 4,894,842 to Broekhoven et al. details a specialized spread-spectrum receiver for GPS satellites which employs direct sampling of the multiple received RF signals into a digitized baseband signal containing the multiple spread-spectrum modulations from the several satellites. The coded satellite data streams are then extracted sequentially using a single common digital-processing circuit block, thus providing a significant savings in hardware over previous parallel-channel code-division multiple-access (CDMA) decoding implementations.

U.S. Pat. No. 4,530,103 to Mosley, Jr. et al. discloses a baseband PN code-tracking method and apparatus utilizing a programmable numerically-controlled oscillator (NCO) which adjusts the phases of dual spread-spectrum code correlators according to a feedback signal produced by a post-detection baseband signal processor.

U.S. Pat. No. 5,903,593 to Ishiguro et al. describes a spread-spectrum receiver with faster synchronization and simpler circuitry than prior-art analog implementations by employing a digital synchronization-control scheme which uses a switchable multiple-index frequency-divider to alter the phase of the sync-reference signals. By rapid duty-cycle modulation of the divider indices, the average sync-timing errors are reduced.

All of the above receiver correlator-circuit implementations share at least one commonality in that they require the presence of at least $2^N-1$ shift registers, $2^N$ binary adders, and a summing network with $2^N$ inputs, or the equivalent in programmable logic devices. Thus, there remains room in the art for a receiver which will require fewer registers and gating and, thus, will require a smaller surface area when fabricated in an integrated-circuit (IC) chip implementation.

U.S. Pat. No. 4,744,094 to McCarren discloses a novel digital binary phase-shaft keyed (BPSK) demodulator employing an XOR gate, a generic phase-locked loop (PLL) for carrier regeneration, and a "D"-type flip-flop to decode and clock out the data stream. The BPSK demodulator circuit extracts the carrier frequency from the incoming signal by effectively canceling the data-induced phase inversions. When the input BPSK signal is near the center frequency of the VCO, the signal sampling occurs at approximately the middle of each cycle, or at approximately a 90-degree phase offset. A drawback of the realization is that the sampling will occur at points with much smaller or larger phase offsets than the nominal 90-degree figure as the signal input frequency moves farther away from the current VCO center frequency. The approach used in the instant invention avoids this issue (FIG. 7) by using a phase-frequency detector (PFD) 20, which has the property of possessing a zero-degree phase offset for any frequency when the PLL is in a locked status. (A thorough discussion of PFDs may be found in B. Razavi, *RF Microelectronics*, Prentice-Hall, 1998, pp. 258–261). The VCO output 52 is the carrier frequency, and the output of the XOR gate 18 is the baseband chip data signal. The clock recovery circuit 24, as described in D. H. Wolaver, *Phase-Locked Loop Circuit Design*, Prentice-Hall, 1991, pp.211–237, is included to properly align the clock signal with the chip data for use in the correlator circuitry 26 and to reduce jitter in the clock signal.

Another aspect of the prior art lies in the implementations of RF channel equalizers to reduce data errors. U.S. Pat. Nos. 5,444,739 and 5,563,911 to Useugi et al. disclose improvements to prior-art combinations of forward and feedback-type transversal channel-equalization filters used in digital communications systems such as GSM cellular phones, via selective control of the filter topologies according to estimated channel impulse responses. When fewer significant multipath components are detected in the received signals, the filters are simplified in topology (number of branches), thus reducing power consumption in the receiver. U.S. Pat. No. 5,402,445 to Matsuura discloses a decision-feedback equalizer (DFE) implemented with a parallel-distributed group of tap-coefficient adders rather than the usual serial topology; this provides higher speed operation than with prior-art approaches. U.S. Pat. No. 4,747,105 to Wilson et al. discloses a method for linear feedback digital-data sequence estimation with concurrent error correction. By comparing an incoming sequence (presumed to be generated by a known linear-feedback shift-register [LFSR] technique) to its predicted values and a calculated set of parity bits derived from specific terms in the sequence's known defining polynomial, the received values are tested for correctness and corrected as necessary, while minimizing the probability of false correlation detects. This technique, however, is intended only for LFSR-derived sequences and is thus not useful for more generalized systems employing convolutional coding and the like. A more popular scheme is the maximum-likelihood sequence-estimation detector, commonly known as the Viterbi decoder, after its inventor. Numerous all-digital implementations of Viterbi-type data decoder circuits have been described in the literature, such as U.S. Pat. No. 5,307,374 to Baier, U.S. Pat. No. 5,887,007 to Iwata et al., U.S. Pat. No. 5,923,713 to Hatakeyama, and U.S. Pat. No. 5,881,106 to Cartier, each of which describe varying reduced-hardware implementations of Viterbi processors, but configured with totally digital circuitry or also using software-programmable logic.

A technique more relevant to the instant case employing a classic form of layered neurons in an analog-implemented artificial neural-network (ANN) format, optionally in conjunction with a digital control and sequencing logic block, to compute the Viterbi-algorithm path metrics and select the maximum-likelihood output sequence is described in U.S. Pat. No. 5,548,684 to Wang et al. (This implementation will be examined in much greater detail in the following sections). This invention, however, is targeted exclusively at the data-decoder application; the use of similar signal-processing techniques for optimizing adaptive RF channel equalizers is not mentioned. The circuit topology of the '684 case, although effective, is significantly different and more complex than the specialized CMOS analog array-processing circuitry embodied in the instant invention. In general, all the aforementioned data equalization and error-correction schemes require significant amounts of digital logic to perform their functions; in contrast, the instant invention instead relies principally on area- and power-efficient analog and mixed-signal CMOS IC-based circuitry to handle these processing tasks.

SUMMARY OF THE INVENTION

It is an object of this invention to provide a channel-adaptive high-fidelity receiver for quickly synchronizing to a spread-spectrum signal.

It is also an object of this invention to provide a channel-adaptive high-fidelity receiver which primarily uses mixed-signal blocks on the same CMOS chip.

It is a further object of this invention to provide a channel-adaptive high-fidelity receiver which for the spread-spectrum code synchronization function requires only 2N digital shift registers and a minimal number of gates.

It is an even further object of this invention to provide a channel-adaptive high-fidelity receiver utilizing mixed-mode (analog plus digital) circuitry for the transversal (delay-line) equalizers and a Viterbi-type maximum-likelihood data decoder for higher receiver system performance, concurrently with lower power and significantly reduced IC footprint.

It is an even further object of this invention to provide a channel-adaptive high-fidelity receiver utilizing mixed-mode circuitry for the transversal (delay-line) equalizers and a Viterbi-type data decoder which have been specifically configured to be operable at the chipping rate of the received spread-spectrum signals to provide substantially greater multipath immunity, particularly in indoor and mobile communications environments.

It is an even further object of this invention to provide a channel-adaptive high-fidelity receiver which only requires internal logic clock rates equivalent to the spread-spectrum bit ("chipping") rate rather than at N times that speed.

This and other objects of the invention are achieved by a fast-synchronizing receiver comprising an equalizer configured for manipulating a signal; a detector in communication with the equalizer; a filter in communication with the detector; a decoder in communication with the filter; an oscillator in communication with the filter; a gate for receiving the manipulated signal; a circuit portion for synchronizing and tracking the manipulated signal; a summing circuit in communication with the digital circuit portion; and, an output gate.

BRIEF DESCRIPTION OF THE DRAWINGS

FIGS. 4*a*–4*e* provide a set of graphs and tables illustrating the functioning of a representative soft-decision Viterbi-type data decoder.

DETAILED DESCRIPTION OF THE INVENTION

Figure 1:
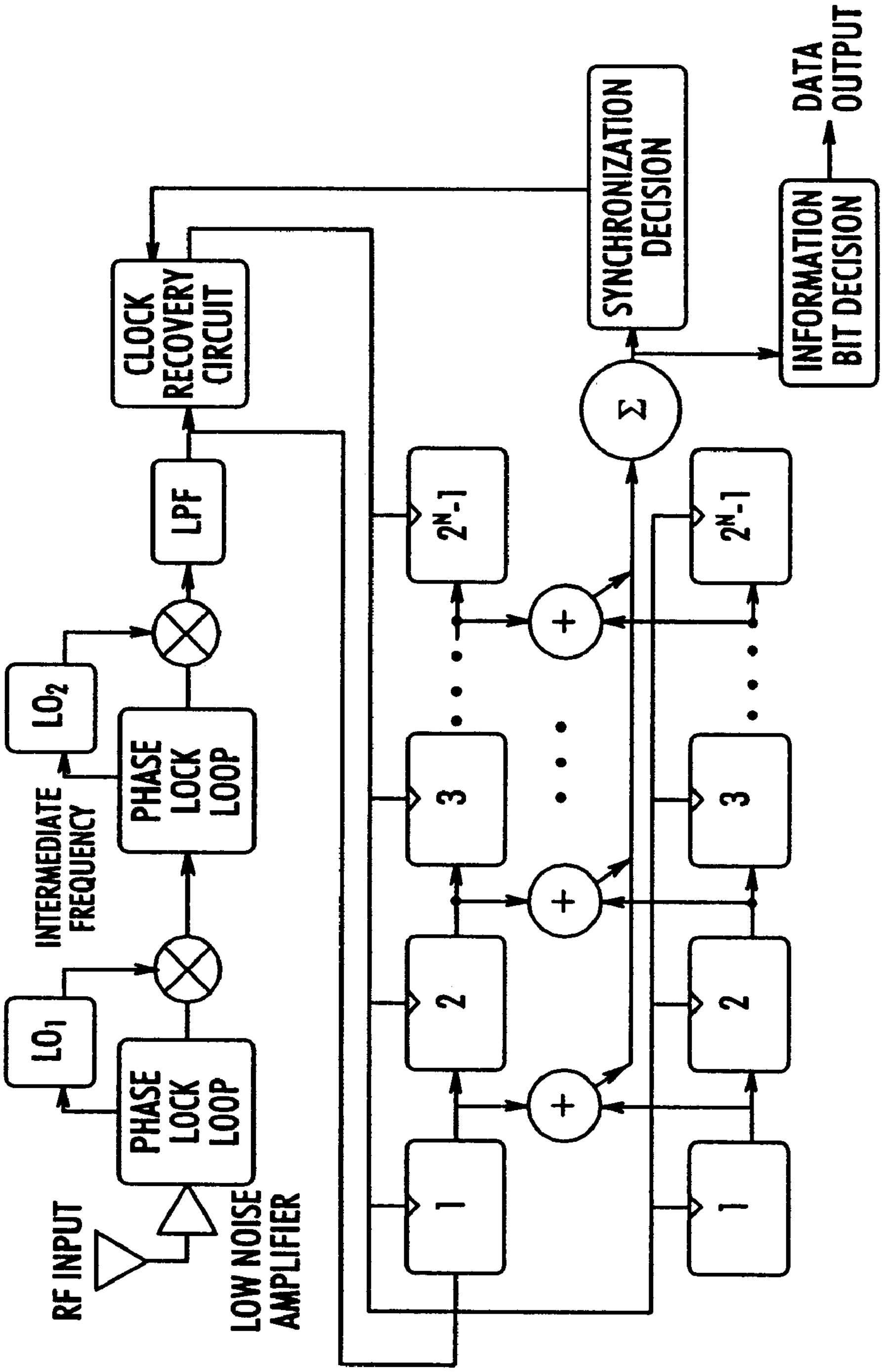
FIG. 1 is a schematic diagram of a prior-art spread-spectrum receiver.

The typical prior-art spread-spectrum receiver, as shown in FIG. 1, uses a sliding correlator with approximately $2^N-1$ shift registers, $2^N$ binary adders, and a summing network with $2^N$ inputs for synchronization. The receiver of the present invention, on the other hand, requires only 2N shift registers and very few additional gates. Additionally, an adaptive equalizer facilitates improved performance of the synchronization circuitry of the present invention by providing a sufficient quality level (measured as the signal-to-noise-and-distortion ratio or "SINAD") for the signal presented to the synchronization circuitry. The complete system circuitry has been developed in a way that accommodates implementation via mixed-mode application-specific integrated circuits (ASICs) such as those fabricated in CMOS technologies, thus allowing the use of mixed-signal (digital-plus-analog) blocks on the same low-cost, high-density CMOS chip.

Figure 2A:
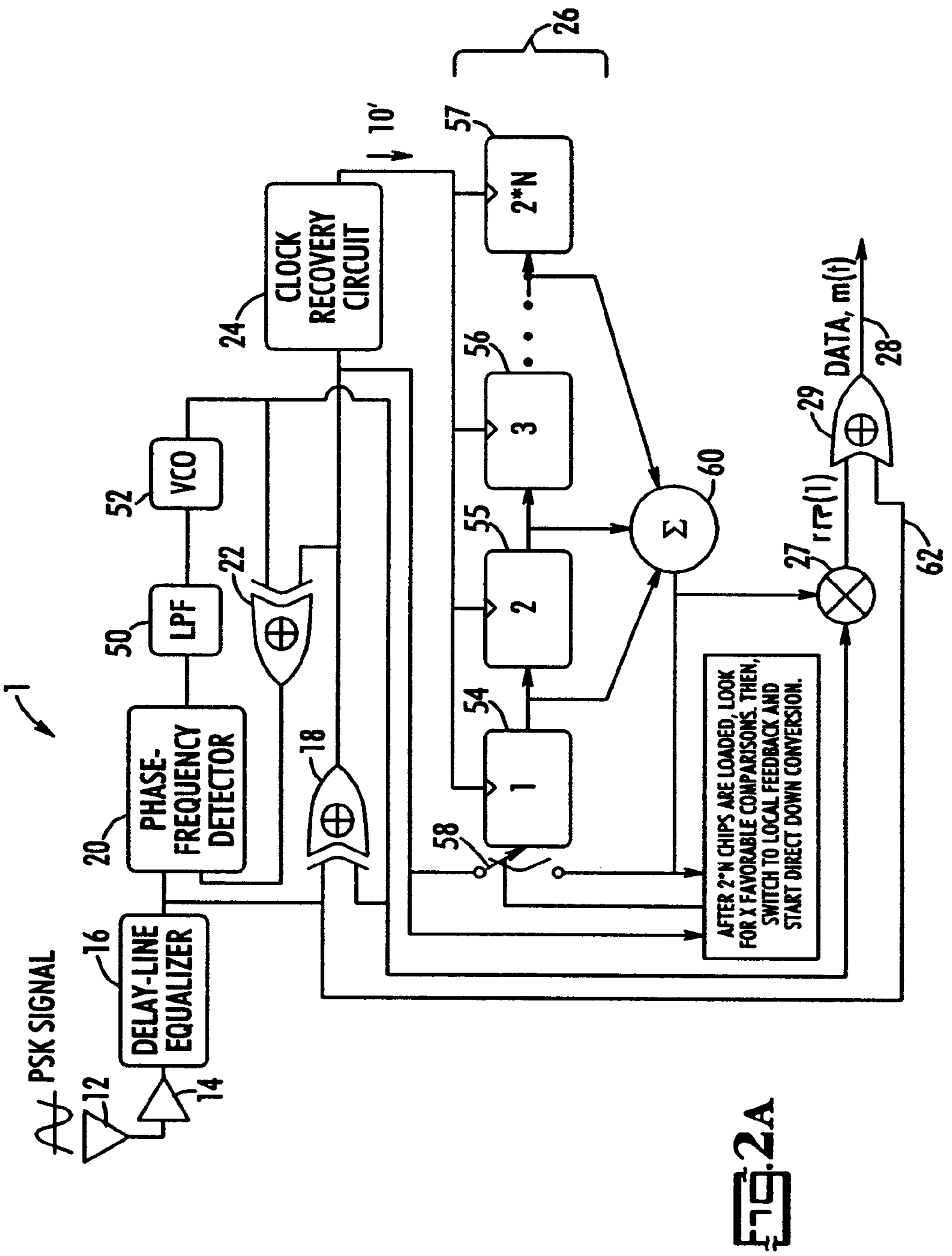
FIGS. 2*a*-2*b* are schematic representations of (FIG. 2*a*) the receiver of the present invention, with (FIG. 2*b*) a detailed circuit diagram of the embedded phase-frequency detector ("PFD") therein.

The overall receiver schematic of the present invention is shown in FIG. 2*a*. In the preferred embodiment, the phase shift-keyed (PSK) signal 10 enters the receiver 1 via a conventional antenna 12 and low-noise preamplifier 14. The signal 10 then enters the equalizer 16, such as an adaptive channel equalizer or delay-line equalizer (transversal filter), which corrects deficiencies in the signal caused by channel degradations as further described in relation to FIG. 3. Following the equalizer 16, an exclusive-OR ("XOR") gate 18 located within the XOR-based circuit derives the clock phase information in the clock-recovery circuit 24. Timing recovery, however, may in general be accomplished before, during or after synchronization and is not limited to solely afterwards, as is shown in the schematic of the present invention. The synchronization and tracking circuit (or digital circuit) 26 decodes the spread-spectrum signal 10 using a minimum amount of logic.

The antenna 12 utilized in the present invention may be any conventional RF antenna suitable for the selected receiving band. Additionally, the low-noise preamplifier may also be any conventional RF preamplifier. The operations of the equalizer 16 are detailed in FIG. 3. As shown, a received signal is applied to a plurality of delay elements 32, 34 and 36 and further to a plurality of weighting elements $W_x$, each having a respective weight coefficient x in the range of $-1<x\leqq+1$. Outputs from the weighting elements $FF_x$, where again $-1<x<+1$, are applied to an adder 38 and the output 39 of the adder 38 is then applied to a analog decoder 30 to appear as an output 42 from the equalizer 16. At the same time, the output 44 from the equalizer 16 is applied to a plurality of feedback type delay elements 46, 48 and 50 associated with a plurality of feedback type weighting elements $W_{-x}$, where $-1<x\leqq+1$, for providing an error signal $FB_{-x}$ to the adder 38 and thus to the equalizer 16 for signal correction. The feed-back error signal $FB_{-x}$ is subtracted from the equalizer 16 output to provide a corrected signal.

In accordance with this invention, feed-forward weights $W_x$ are initialized based on a priori knowledge of the PN (pseudorandom-noise) code and/or via a specific transmitted training sequence, while the feedback weights $W_{-x}$ are initialized to zero. The weighting functions are preferably optimized during a transmission burst, ideally using the training signal or otherwise with a typical data sequence. The feedback output from the analog decoder 30 is an error signal. The information in the error signal is used to adjust the weights in both feed-forward (FSE) and feedback equalizer blocks in a predictive fashion.

Employing the usual minimum mean-squared error (MSE) criterion for adjusting the tap weights of a decision-feedback equalizer (DFE) with N+1 forward taps and M feedback taps, the optimum forward tap gains $\{f_i\}$ and feedback tap gains $\{b_i\}$ are given by the solution of the following sets of simultaneous equations:

$$\sum_{j=-L}^{N}\left[f_j\overline{|a_k|^2}\sum_{p} g(pT+\tau T-j\Delta)g*(pT+\tau T-l\Delta)+N_0\delta_{jl}\right]-$$

$$\overline{|a_k|^2}\sum_{j=l}^{M} b_j g*(jT+\tau T-l\Delta)$$

$$=\overline{|a_k|^2}g*(\tau T=l\Delta),\quad -L\leq l\leq N$$

and $$b_l=\sum_{j=-N}^{0} f_j g(lT-j\Delta+\tau T),\quad 1\leq l\leq N$$

where D is the tap sample-time spacing, g(t)=f(t)*h(t) is the overall RF channel impulse response including the equalizer filtering f(t) and the channel characteristic h(t), t is the normalized sampling-time error, and $d_{j1}=1$ for j=1 and zero otherwise. The right-hand side of the equation above represents a convolution of the sampled channel impulse response from the transmitter to the input of the forward leg of the DFE taken at time spacing of D, with the discrete-time impulse response of the forward equalizer. The results are sampled at time T, and only values on the right-hand side of the center sample are calculated; these samples are associated with multipath-induced intersymbol interference due to the past M transmitted symbols. The value of the minimum MSE is:

$$\xi_{min} = |\overline{a_k^2}|\left[1 - \sum_{i=-L}^{0} f_j g * (\tau T - i\Delta)\right]$$

The equations given are optimum for the usual PAM, PSK, and QAM modulation techniques; algorithms tailored for other modulations have been extensively documented in the technical literature.

Although channel equalizers have been frequently employed in non-spread digital communications applications, their use has not generally been exploited for spread-spectrum systems, since spread signals are usually resistant to the types of degradations caused by multipath and/or fading channels, which are often corrected via adaptive equalization. However, in difficult propagation environments as the indoor and mobile scenarios recited above, adaptive equalization of the spread-spectrum channel can achieve significant improvements in error rates and/or channel utilization factors.

The equalizer circuit 16 implementation lends itself to optimization in a mixed-signal (i.e., analog-plus-digital) ASIC chip. The delays, for example at 32, 34, and 36, consist of switched-capacitor delay lines (similar to analog memory). The summing function or adder 38 is accomplished using a current-summing transistor network. Thus, the digital computations that normally require several DSP (digital signal processing) chips can be accomplished using a modest amount of analog circuitry in a mixed-mode CMOS design. This "soft" channel equalization process (analogous to the well-known quantized ("soft") digital maximum-likelihood Viterbi data-decoding algorithm) is generally somewhat more accurate and requires significantly less chip area than the conventional all-digital approach.

Figure 3:
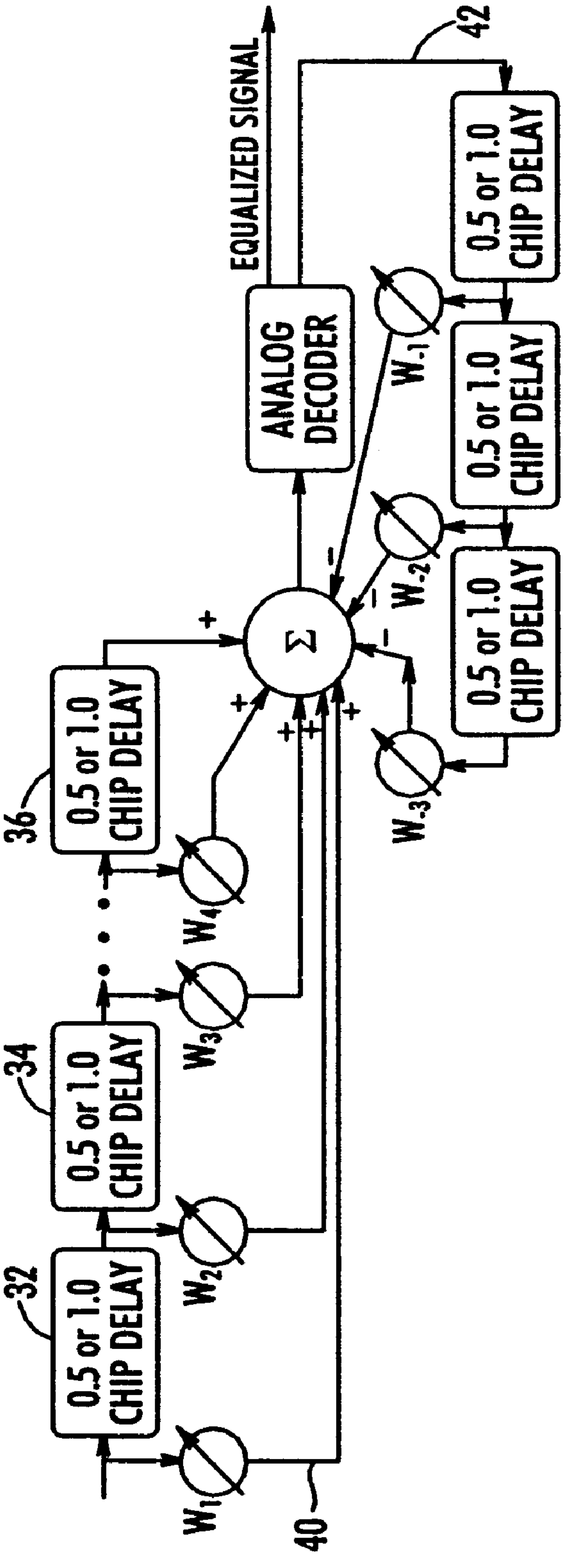
FIG. 3 is a schematic representation of the equalizer of the present invention.

The "soft" channel equalization process can be accomplished either in the more conventional baseband mode after the digital demodulation processor at an RF or intermediate frequency (IF) in a bandpass mode. In the former (post-demodulation) scenario, the individual data-delay blocks 32, 34 and 36 depicted in FIG. 3 are conventionally implemented by individual "D" flip-flops, and the various scaling/multiplying nodes are hardware multipliers. Often, to lower hardware costs in current-art board-level applications, these delays and the tap scaling or weighting functions $W_x$ and $W_{-x}$ are handled in software by a digital signal processor (DSP) chip following the digital data-demodulator (decode) block. In the present invention, the use of mixed-signal (digital-plus-analog) CMOS chip technology permits the fabrication of both digital logic and analog signal-processing circuit on the same die. The resulting device can simultaneously provide higher density (smaller size), superior performance, lower power consumption, and reduced cost compared with more conventional systems employing separate digital and analog components. Accordingly, the delay elements can be easily realized using analog memory-cell structures similar to those described in U.S. Pat. No. 5,590,104 and U.S. Pat. No. 5,671,172, which are commonly owned by the assignee and are incorporated herein by reference.

In the equalizer 16 architecture of the present invention, the respective analog signals are sampled and stored ("read-in") as corresponding voltage levels on integrated CMOS capacitors placed in an on-chip array associated with delays 32, 34, and 36. These delays 32, 34, and 36, otherwise known as switched-capacitor memory cells, are subsequently read-out by high input-impedance buffer amplifiers to provide an accurate reproduction of the stored voltage levels in the cells without significantly disturbing said voltages. In the typical post-detection equalizer, the single-bit samples are delayed (stored-then-read) for either ½ or 1 bit (or, in spread-spectrum applications, ½ or 1 "chip" [spreading-code-bit]) time. The output bit from each delay element 32, 34 and 36 in the forward path 40 is multiplied by a weighting coefficient $W_x$, which is usually between −1 and +1 in value. This weighting coefficient is defined by a selected equalization polynomial representing the value computed to optimally correct the normalized finite-impulse response of the channel in question (via the equalizer structure just described) to minimize its overall transmission bit-error rate. The selection of a particular equalization algorithm is a complex issue and is described, for example, in detail in the text *Digital Communications*, *3rd Edition*, by John Proakis (McGraw-Hill, 1995), which is hereby incorporated by reference. Usually, the explicit computations are handled by DSP software routines, although specific fixed algorithms may be embedded as mixed-mode hardware structures in the equalizer device if desired. The instant case also provides for a novel implementation of the equalizer tap controller using analog array circuitry for lower power and smaller chip area.

The architecture of the present invention is capable of operating efficiently even with multipath-degraded wireless data channels. Thus, the receiver equalizer 16 may optimally employ a composite topology, using a fractionally-spaced equalizer (FSE) structure in the forward path 40 and a decision-feedback equalizer (DFE) structure in the backward (feedback) path 42, as shown in FIG. 3. The FSE structure in the forward path 40 is used to cancel out the majority of the multipath energy. The burst timing determines the amount of signal energy to be captured by the FSE structure as well as the amount of precursor power to be tolerated by the receiver 1. Rather than the usual hard-decision (two-state or comparator) form of binary bit detector, a continuous-level (analog) demodulator (not shown) is employed downstream of the channel equalizer 16 to provide a "soft-decision" function similar to that sometimes used in conjunction with conventional Viterbi-type data-bit decoders. In general, it is widely recognized in the art that the soft-decision form of data-bit decoding offers a 2- to 3-dB improvement over hard-decision decoding in pure additive white Gaussian noise ("AWGN") dominated channels; significantly, in varying-amplitude fading-type channels (more typical of real applications) the improvement can actually be greater than 9 dB. Instead of the current-art practice of feeding the quantized multilevel output from the demodulator into the multi-bit but discrete Viterbi circuitry, however, the present device utilizes the direct analog voltages from the detector to represent the relative detector output signal level. Compared with the simple hard-decision (0/1, or 1-bit) decoder, an 8-level (3-bit) Viterbi circuit may provide about a 2-dB improvement in effective sensitivity in a Gaussian noise-dominated channel. Moreover, the use of analog ("infinite-resolution") signals as provided in the present invention adds an even further improvement of about 0.2 dB to the equalizer 16 circuit's effective performance in a Gaussian noise-dominated channel, and significantly more in fading channels. Additionally, the use of analog signals internal to the system is key in allowing the use of smaller area (and, thus, lower cost) circuit implementations for monolithic (i.e., chip) designs.

In accordance with the invention and as a result of the use of analog signaling, the detector output voltage is sampled and stored in an analog-memory cell within the equalizer 16, according to the selected full- or fractional-bit rate clock (not shown). The onboard Viterbi-type calculation circuitry (analog, digital or mixed-mode) determines the Euclidean distances (referred to as Hamming distances in discrete signal sets) of the received data sequences from the respective anticipated code sequences (often called trellis paths) and stores the resulting path metrics in other memory cells. Path-metric computations, generally used in the Viterbi maximum-likelihood decoding context to track the relative likelihood of the various possible received data-bit sequences, are similarly utilized in equalizer applications to estimate (and subsequently cancel) the residual signal "tails" caused to the signal at hand by intersymbol interference (ISI) from both earlier and later data bits in the transmitted sequence. This process in essence seeks to optimize the channel impulse response and concurrently deconvolve (or separate) the successive bits in the received waveform sequence. The usual method of calculating the various path metrics in the Viterbi algorithm requires generating the log-likelihood functions for the various branches, normalizing them to simplify the math, and adding the successive metrics (equivalent to multiplying the respective probabilities) to obtain the full-path likelihood estimates.

To better illustrate the usefulness of the analog (continuous-signal) approach, we assume that the transmission link can be modeled as a discrete symmetric channel, as denoted in the diagram of FIG. 4*a* [after Wicker, pp.301–303]. Here, the transmitter sends one of two discrete values (0 or 1); the receiver circuitry assigns one of four values ($\underline{0}$,0,1, or 1) to each demodulated signal symbol. The underlined zero and one represent clear, strong signals, while the non-underlined pair correspond to weaker, less-certain signal levels. In this simplistic example, the soft-decision receiver only uses 2 bits of resolution to distinguish the 4 states, but the resulting decoding-accuracy performance advantage over the hard-decision system is well documented. In FIG. 4*b* are given typical values for the conditional probabilities [i.e., the probability that, given a transmitted symbol y, the symbol r is received, denoted "p(r|y)"] for the received symbols in 4*a*, plus the relative shapes of the 4 respective probability-density functions (PDFs) versus detector output voltage; the corresponding log-likelihood functions are tabulated in FIG. 4*c*. The normalized, rounded values typically used in the path-metric calculations are furnished in FIG. 4*d*, according to the equation:

$$M(r|y)=1.5[\log_2 p(r|y)-\log_2(0.05)]$$

Figure 4E:
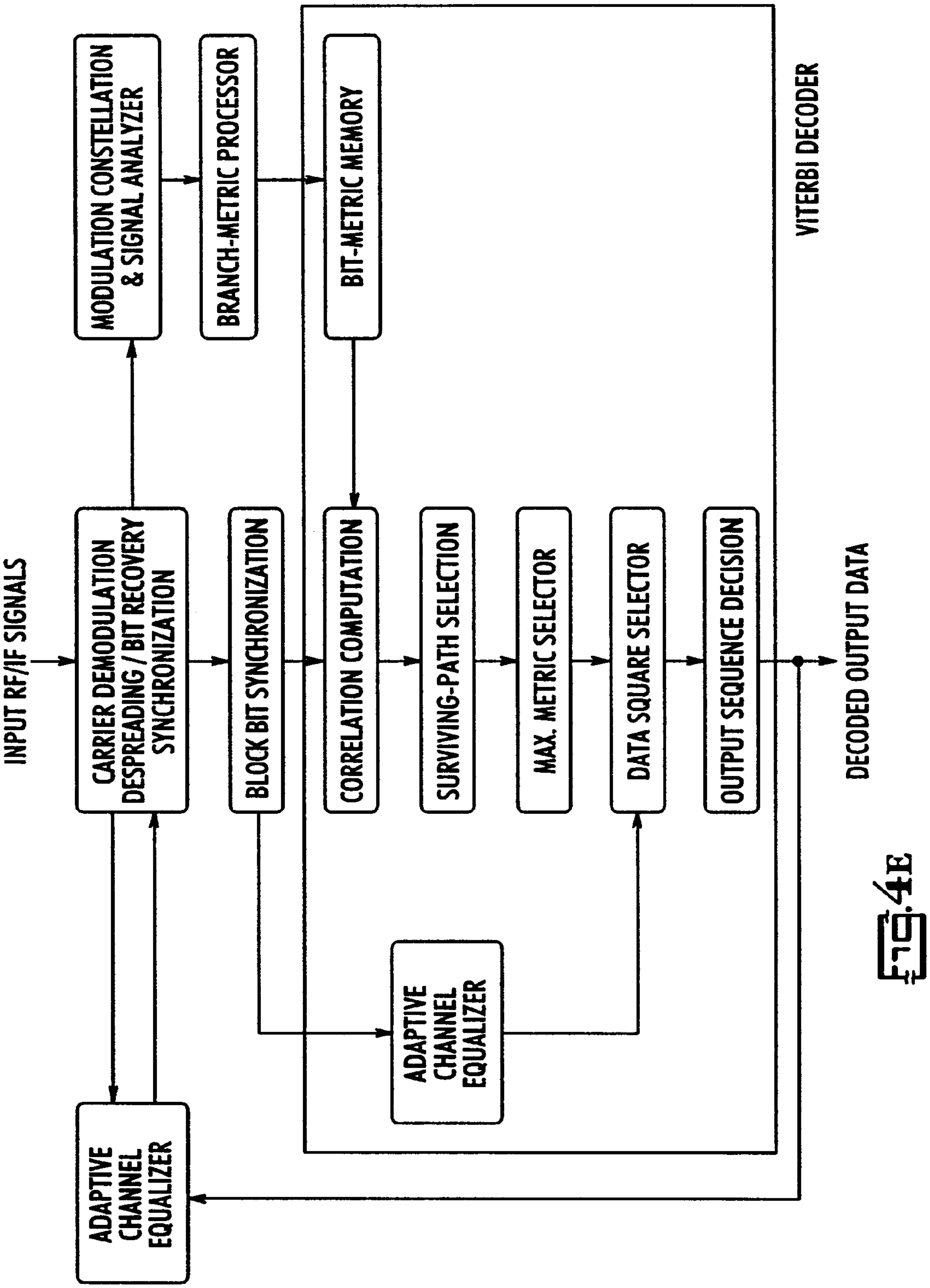

It is evident that these approximate values for the path metrics are sufficient to provide excellent decoding accuracy; thus, the use of slightly imprecise analog circuitry to handle these computations produces no discernible problems to the Viterbi soft-decision process. For a Gaussian noise-dominated RF channel, the path metrics commonly employed in the existing art are digitally calculated as (mathematically) simply the inner products of the received word vectors and the allowable code word vectors:

$$M(r|y)=r\_y$$

and the individual bit metrics are:

$$M(r_i^{(j)}|y_i^{(j)})=r_i^{(j)}y_i^{(j)},$$

where $r_i^{(j)}$ is the jth bit of the ith received symbol and $y_i^{(j)}$ represents the corresponding inputs to the channel. The diagram of FIG. 4*e* provides an overall signal-processing flow description for the receiver, focused around the basic operations of the Viterbi/SS decoder. The multiple feedback paths employed in the novel overall receiver optimization methods of the present invention are also illustrated.

In lieu of the usual digital and/or software techniques, in the instant invention, the path-metric summations are generally performed in an array of "leaky" analog integrator circuits which store the totals in parallel. The integrators in the array typically share common reset and dynamic decay controls which can be used to restart or dynamically scale the arrayed output voltages to avoid network saturation or nonlinearities if the accumulated path-metric values become too large.

The primary analog CMOS computational elements employed in the two-dimensional pattern-matching array are depicted in the various subparts of FIG. 5 [after Mead, Ch. 5–12]. Many of the basic adjustable-gain functions are handled by transconductance (voltage-in, current-out) amplifiers, such as the simple circuit of FIG. 5*a*. The current mirror formed by Q3 and Q4 is used to produce the output current, which is equal to $I_1-I_2$. The circuit symbol is given in the inset. FIG. 5*b* is a schematic of a wide-range, higher-performance transconductance amplifier circuit. FIG. 5*c* is a simple current adder-subtractor stage, where the final $I_{OUT}=I_1+I_2-I_3-I_4$. FIG. 5*d* depicts a basic absolute-value (or full-wave rectifier) circuit. Embodied in the correlator and other blocks are 4-quadrant analog multipliers. Where simplicity and small size are preferred over linearity, the circuit of FIG. 5*e* is useful. In the range where the output is roughly linear (tanh x>>x), the circuit multiplies $V_1-V_2$ by $V_3-V_4$. A much more accurate, wide-range version of the multiplier is shown in FIG. 5*f*.

Figure 5B:
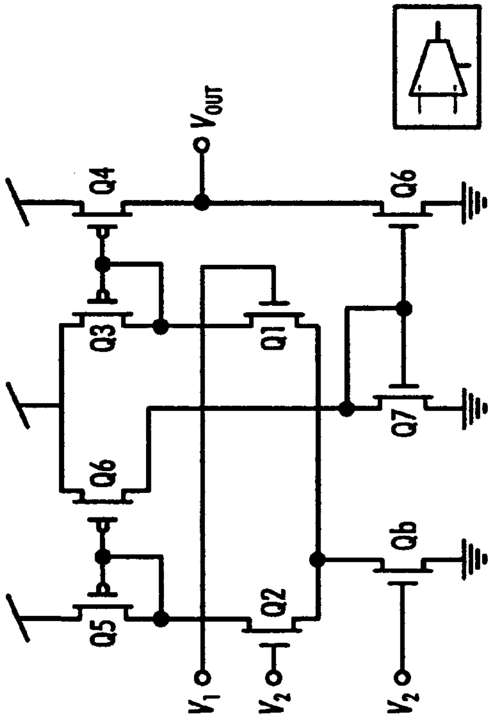
FIGS. 5*a*–5*u* provide schematics on the primary analog-CMOS computational elements employed in the neurobiological analog computational arrays (after Mead).
Figure 5D:
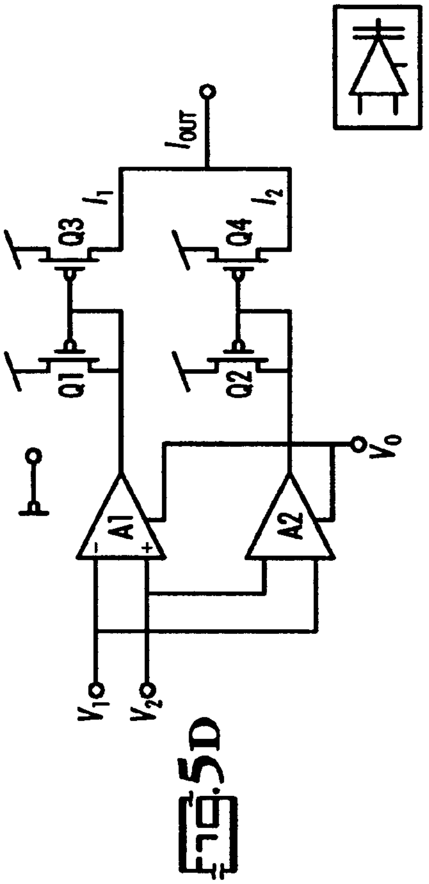
Figure 5A:
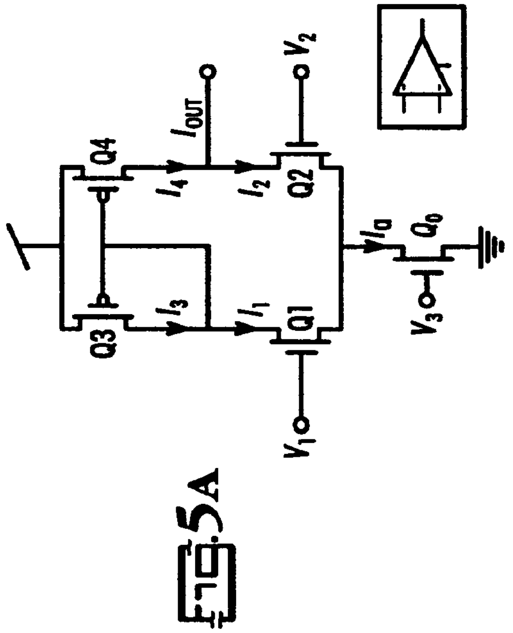
Figure 5C:
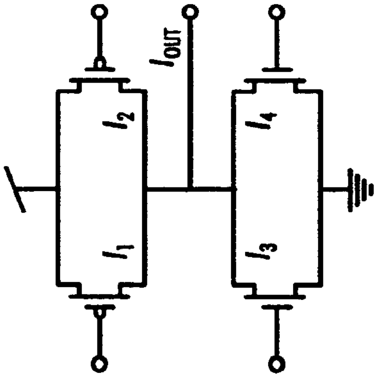
Figure 5E:
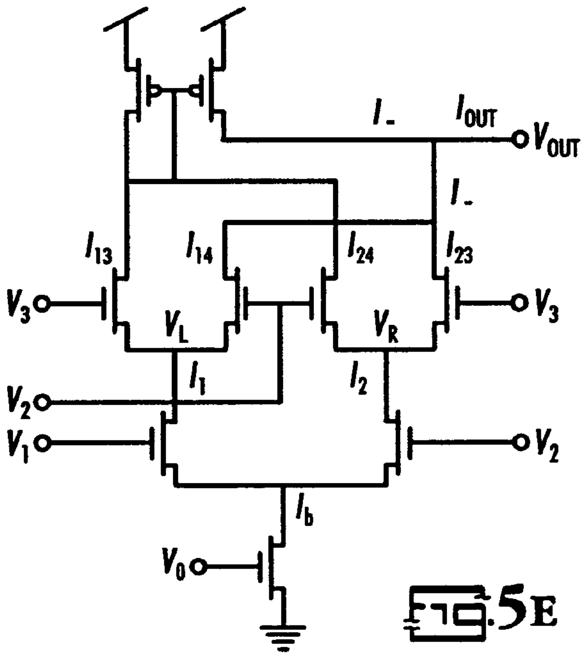
Figure 5F:
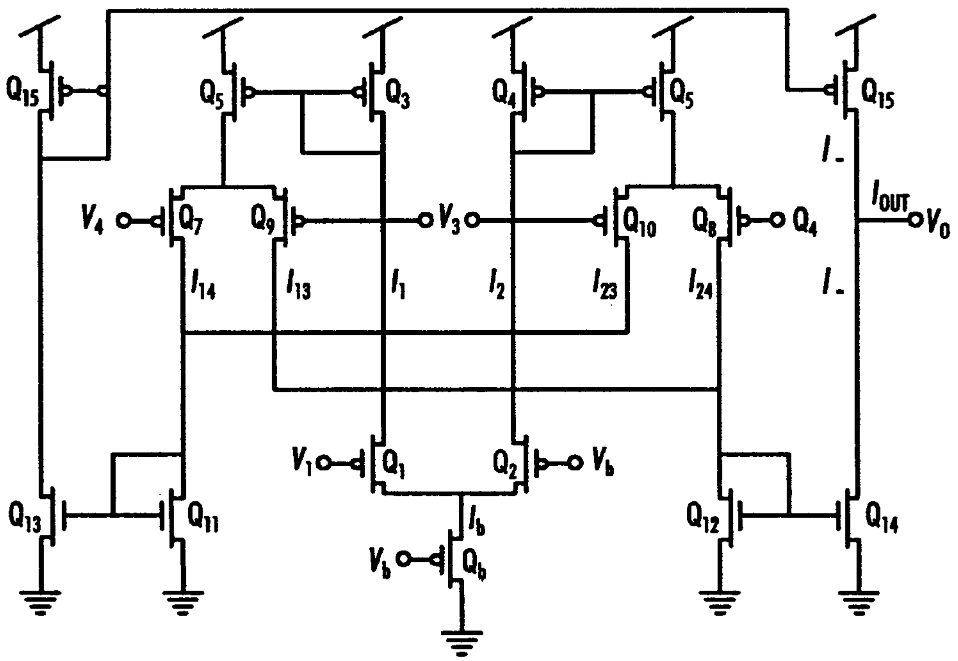
Figure 5M:
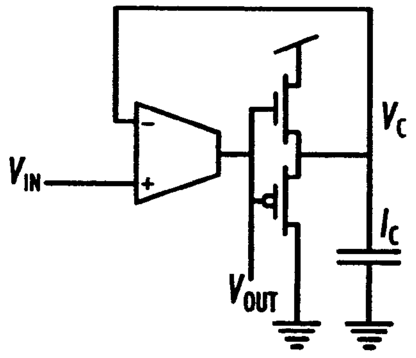
Figure 5N:
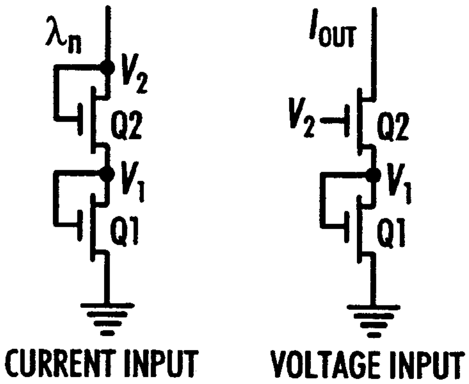
Figure 5O:
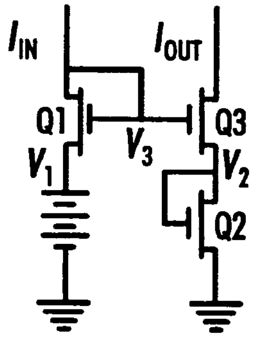
Figure 5P:
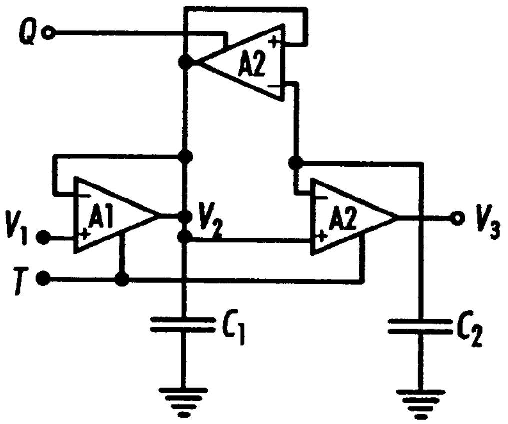
Figure 5Q:
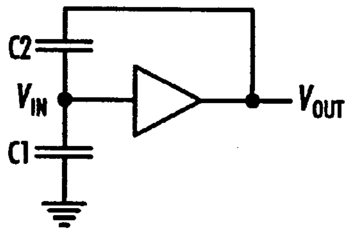
Figure 5R:
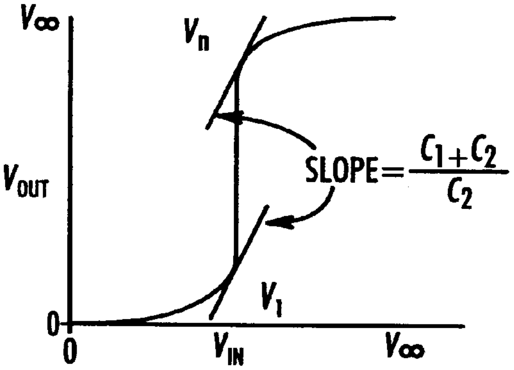
Figure 5S:
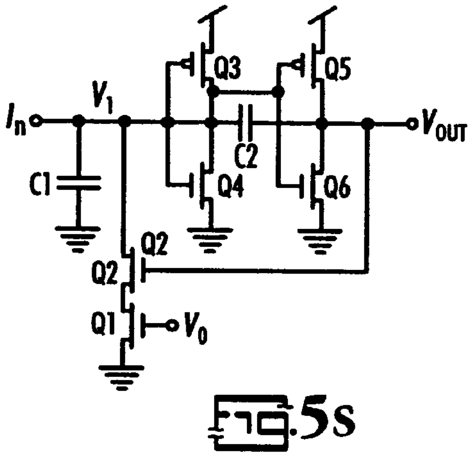
Figure 5T:
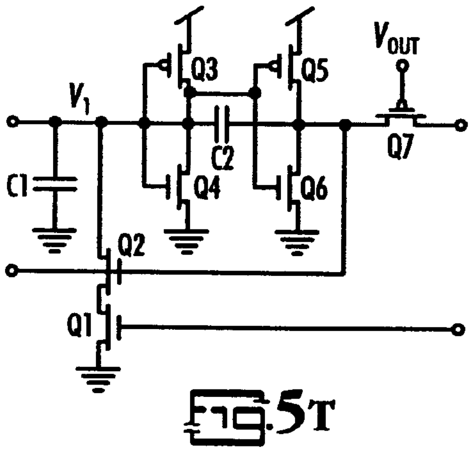

A follower-aggregator circuit, in which each follower supplies a current proportional to the input-output voltage differential, appears in FIG. 5*g*. Each input is weighted by the transconductance of its associated amplifier. FIG. 5*h* depicts the "Horizontal-resistor" circuit for variable-strength interconnections between nodes, depending on the respective gate-to-source voltages of Q1 and Q2. A basic follower-integrator stage configuration is given in FIG. 5*i*, where $V_{out}$ represents the time integral of $V_{in}$. The current into the capacitor is proportional to the difference between $V_{in}$ and $V_{out}$; the rate at which $V_{out}$ can respond to changes in $V_{in}$ is set by the transconductance of the amplifier. A cascade of these stages can approximate a delay line, as in FIG. 5*i*. A simple differentiator (time gradient) stage is shown in FIG. 5*k*; another form of linear differentiator, where the smoothed output of A2 is fed back to the negative inputs of both amplifiers (thereby greatly reducing the effect of input-offset voltages) is depicted in FIG. 5*l*. A third, hysteretic differentiator, better suited for processing noisy signals, is presented in FIG. 5*m*. Two very useful varieties of nonlinear transfer functions can be produced by the logarithmic circuits of FIG. 5*n* and the square-root circuit of FIG. 5*o*. Next, FIG. 5*p* provides a current-controllable second-order linear section for filtering and similar tasks. Other, more "bio-neuron"-like functional circuits include: a latching amplifier with an input threshold and positive feedback (FIG. 5*q*), whose transfer function is plotted in FIG. 5*r*; a self-resetting ("leaky") latch (FIG. 5*s*); and a node repeater circuit, which relays input pulses but is inactive otherwise (FIG. 5*t*). These building blocks can be concatenated to form far more complex operations which emulate neurobiological functions with compact, low-power CMOS structures; Mead's is clearly the preeminent text in this area of circuit research.

Figure 6A:
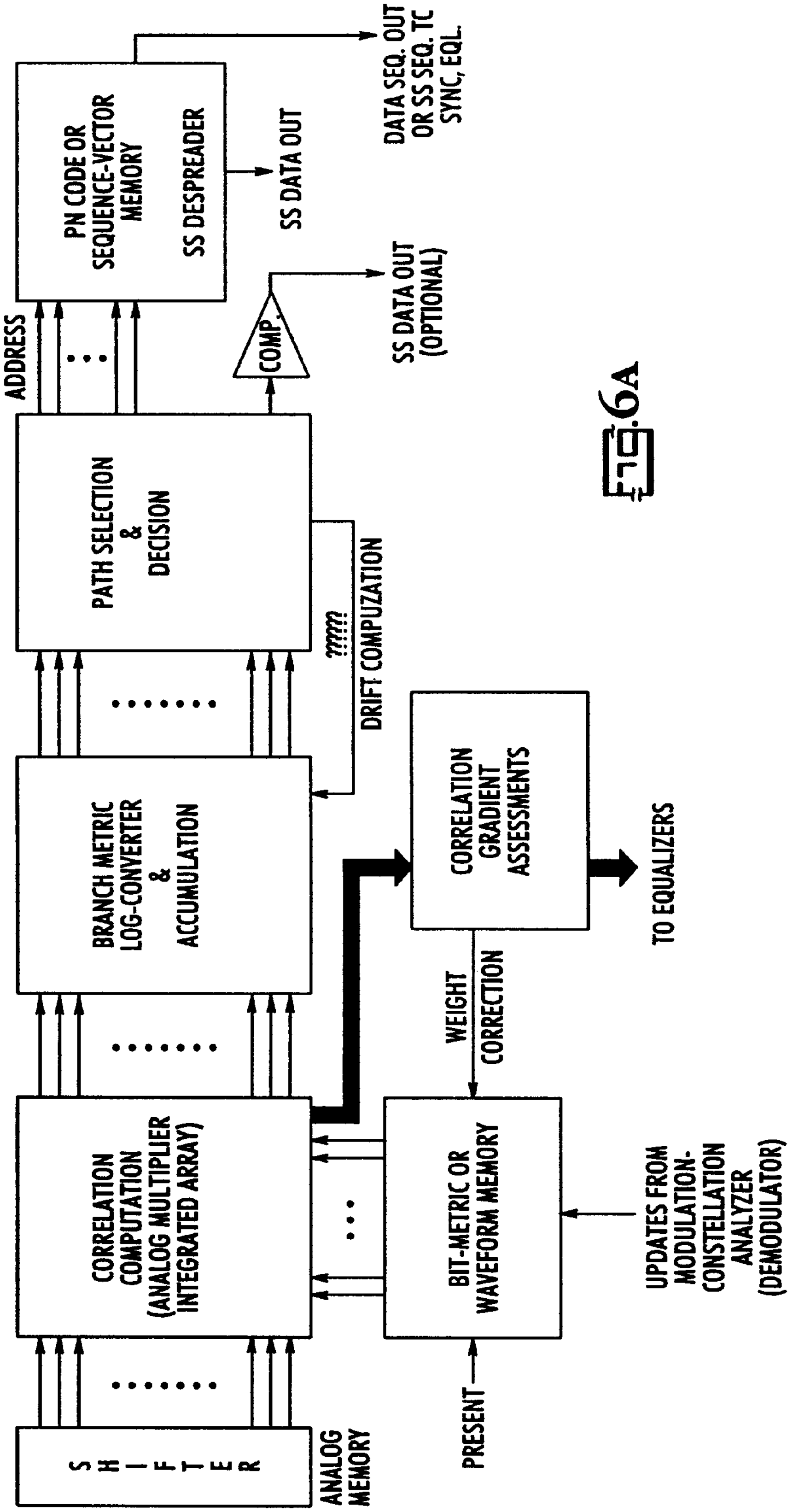
FIGS. 6*a*–6*b* provide a diagram of the basic high-level configuration of the Programmable Spread-Spectrum/Viterbi Decoder of the present invention, plus a layout plot of a typical chip implementation of same.
Figure 6B:
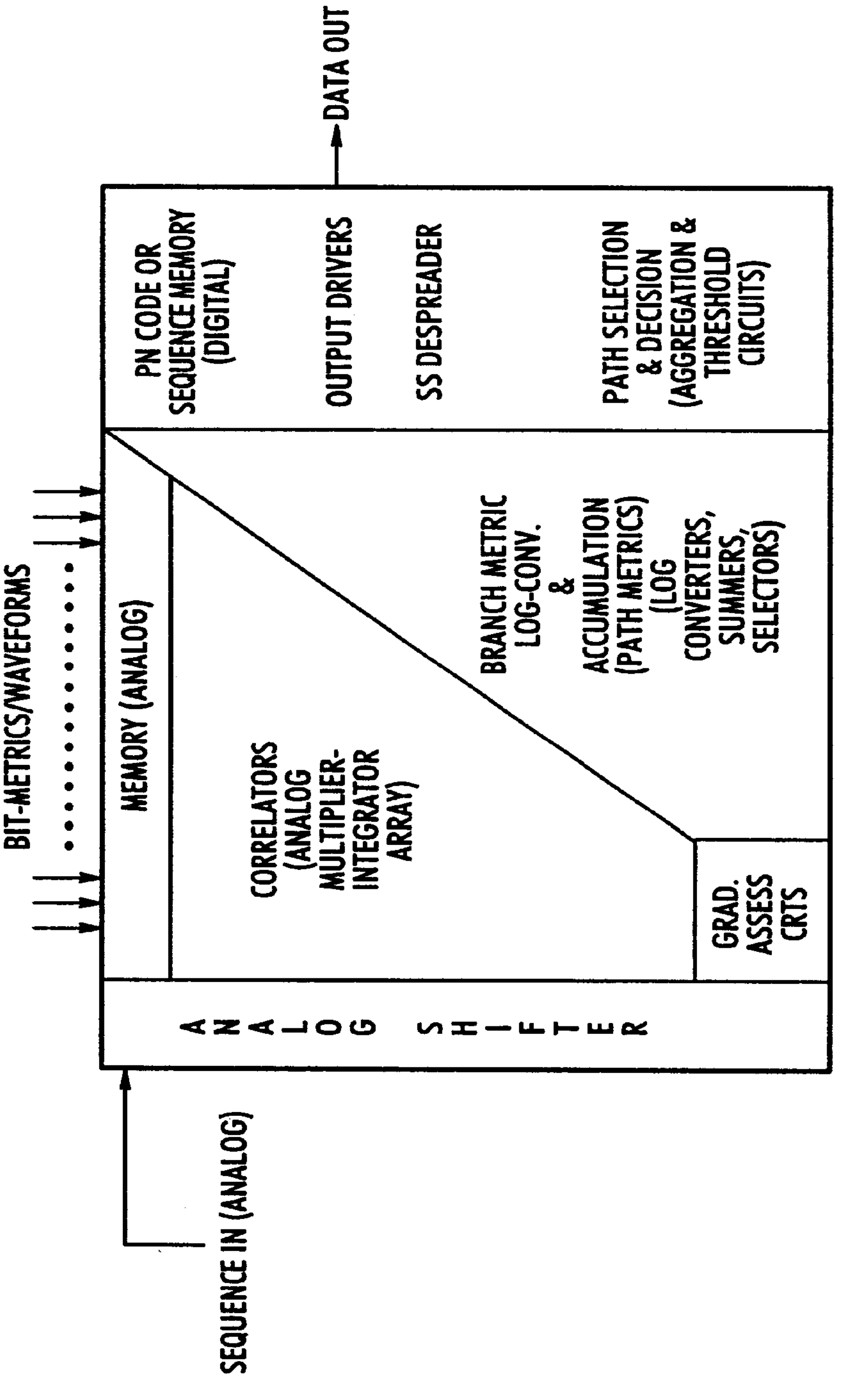

The basic high-level configuration of the Programmable Spread-Spectrum/Viterbi Decoder is shown in FIG. 6*a*. The direct analog waveforms (or simple DC voltages, if averaged) appear in sequence at left and are shifted in by the analog memory configured in a shift-register topology. The multiple Γ output lines (Γ representing the maximum Viterbi decoding depth [at least >>6 times the constraint length of the incoming convolutional code] or for spread-spectrum [SS], the PN code length) apply the detected signals to one side of the Correlation Computation block. This subsystem combines the Γ detector signals with a like number of stored bit-metric values or waveforms in an array of 4-quadrant analog multipliers and downstream integrators to produce the G bit-or chip- correlation values sent on to the Branch-Metric block. This analog subsystem performs the logarithmic conversions (for both positive and negative correlation signals as needed) and provides the summations (accumulations) to produce the conditional-probability products which represent the respective branch metrics in the Viterbi algorithm. For the SS case, the log conversions are accumulated in a faster, chip-oriented regime to assist (within the code epoch) in the earliest possible selection of the PN sequence and its embedded "polarity" (corresponding to the data-bit value). The accumulated group of path-metric values are passed on to the Path Selection & Decision block, which via analog "high-select" circuitry chooses the highest-valued path likelihood functions; the output designation then addresses the digital sequence-vector or PN code memory to provide the final data-sequence bits or SS PN code output chips. Code matching within the Path Selection & Decision block can provide a "fast" SS data output, or the code may be conventionally handled by a downstream correlator/despreader to produce the original pre-spread data stream. To provide ongoing normalization and drift compensation of the analog branch metric and/or SS correlation signals, an analog feedback loop is provided from the Path Selection subsystem back to the Branch Metric block. One distinctly novel feature of this detection system is the use of an optional waveform-based approach to the bit-wise (or chip-wise) correlation calculations; the actual waveform shape, level, timing, and other attributes may be employed to achieve a far better estimate of current RF received signal quality than can be obtained from the period-integrated value alone. Further, assessments of the correlation gradients throughout the computational array can be further utilized to provide corrections to the instantaneous bit-metric (or waveform) values and/or the upstream adaptive signal equalizers as needed to continuously optimize the incoming analog waveforms containing the received data stream, particularly in response to varying RF channel characteristics such as fading and multipath. The corrections to the bit-metric values also permit continuously optimization of the Viterbi/SS decoding processes for highest possible receiving-system performance. Another source for system feedback is provided by bit-metric/waveform updates from the the Modulation-Constellation Analyzer block in the receiver's demodulator; here, ongoing assessments of the incoming analog RF signal characteristics (e.g., amplitude shifts and phase jitter in the received data-modulation signal constellation, noise, distortion, and interference levels) can also alter the bit metrics to dynamically minimize overall BER figures under adverse or changing RF signal-propagation conditions. The companion diagram in FIG. 6*b* provides a typical "floorplan" arrangement for a mixed-mode CMOS chip containing all the aforementioned components of the programmable Viterbi/SS decoder system. Obviously, some of the blocks may vary, depending on the implementation options selected. The basic types of analog circuitry employed are also noted for each subsystem block. Although analog CMOS can be generally exhibit very low power in operation (often lower than comparable digital functions), the relative areas required will be dependent on the process and its inherent geometry; modern feature sizes of 0.35, 0.25, and 0.18 $\mu$m will permit even more complexity in future devices.

As noted by Mead, CMOS transistors biased at subthreshold current levels exhibit an exponential current-versus-voltage transfer characteristic, much as bipolar devices, so generating the required logarithmic functions is quite simple and inherently requires very little power. Comparison circuits (i.e., a "high-select" or "low-select" configuration, dependent on the polarity of the chosen metric), examine the respective composite path metrics and select the trellis path (state sequence) which appears statistically most likely to have occurred. The remaining potential trellis paths (sequences) are rejected and the process continues. Electrically, this comparison process entails comparing the appropriate cell voltages, retaining the desired voltage value, and ultimately discarding the non-desired voltages. A sequentially switched or parallel-control structure may be employed to manage this procedure, depending on whether speed or chip area is the major goal of the particular design.

Once the soft-decision Viterbi-type algorithm has produced the maximum-likelihood estimation of the transmitted data-bit sequence [see, for example, John Proakis, *Digital Communications*, pp.483–492 and pp. 808–814], the output bitstream 44 is fed into an appropriate control algorithm to adjust the tap weights of the feedback-path equalizer 42. Similarly, the input and output sample sequences from the forward-path 40 can be used to compute the desired coefficients for the taps of the FSE array. Once again, the delay elements of the feedback-path array 42 are realized via analog memory cells. The memory cells' respective or corresponding tap-weight multipliers $W_{-x}$, where $-1 \leqq x \leqq +1$, can be implemented via CMOS 4-quadrant multipliers formed from standard differential transistor pairs driven by voltage-controlled current sources. This configuration provides high speed, adequate linearity, low noise, and small circuit areas. The required correlation calculations to yield the tap-weight values can be easily handled via familiar switched-capacitor networks already well developed in the art as fundamental monolithic CMOS building blocks. If the set of input-signal samples shown in FIG. 3 is represented in matrix notation as $[p_c]$; the output of the FSE represented as $[P_{eq}]$; and the set to tap weighting coefficients represented as [C]; the overall FSE transfer function can be written as:

$$P_{eq}=P_cC \quad (1)$$

The coefficient matrix can then be determined by inverting the channel input sequence matrix:

$$C=P_c-1[P_{eq}] \quad (2)$$

The resulting computations can be handled on-chip via analog or hybrid (digitally directed analog) techniques employing either on-chip or external data. Dedicated on-chip logic may also be utilized if fixed-format algorithms are acceptable. More advanced tap-weighting optimization procedures (typically required for the DFE block and optionally useful for the FSE) can be implemented via on-chip analog computing networks. As mentioned previously, although the layered-neuron ANN topology in analog form has been applied to the Viterbi decoding problem in U.S. Pat. No. 5,548,684 to Wang et al., in general the use of analog computing arrays for optimal setting of channel-equalizer parameters has not been established. In addition, the use of channel-adaptive path metrics (for rapidly varying channels) to optimize Viterbi or other algorithms for data decoding has not yet been demonstrated in the art. Further, the analog circuit implementation utilized in the instant invention is a two-dimensional processing array more closely resembling the structures presented in modeling the sensory processing conducted within the human retina and cochlea, as described in the outstanding text, Analog VLSI and Neural Systems, by Carver A. Mead, pp. 207–302. Although termed "neural," the array-processing circuits detailed by Mead truly resemble the corresponding computational structures embedded in the human nervous system to pre-process sensory information and, as such, do not incorporate the layered topology or the classic threshold (TL) or hard-limiting (HL) "neuron" elements of the so-called artificial neural networks (ANNs) emulated in the '684 Patent. In order to differentiate from the terminology from the '684 patent, the term "Sensor-type analog neural network" will be used to describe the type of network of Meade. The resulting two-dimensional arrayed computational blocks cited in the instant case will generally permit the fabrication of high-performance receiver structures and circuitry with greater speed, lower power, and smaller size (and, thus, cost) than conventional-art implementations.

The two fundamental operational modes of the receiver system, i.e., spread-spectrum (correlation decoding with despreading) and the non-spread mode (Viterbi-type decoding of convolutionally encoded data streams) can both be handled via a programmable analog signal-decoding structure with multiple optimization feedback loops. The basic correlation mechanism employed within the analog (or mixed-mode) decoder may be the usual 1-dimensional, single point-per-bit format, where the single value, averaged or integrated over 1 bit time, is compared with a scalar bit-metric value. However, the architecture here also provides for a correlation of received and reference waveforms over the same bit-time interval, which can yield significantly more information about the incoming signal quality than the standard 1-D method. Even spread-spectrum signals, compared on a chip-by-chip basis, can exhibit greatly improved reception quality over conventional existing-art methodologies.

Figure 7A:
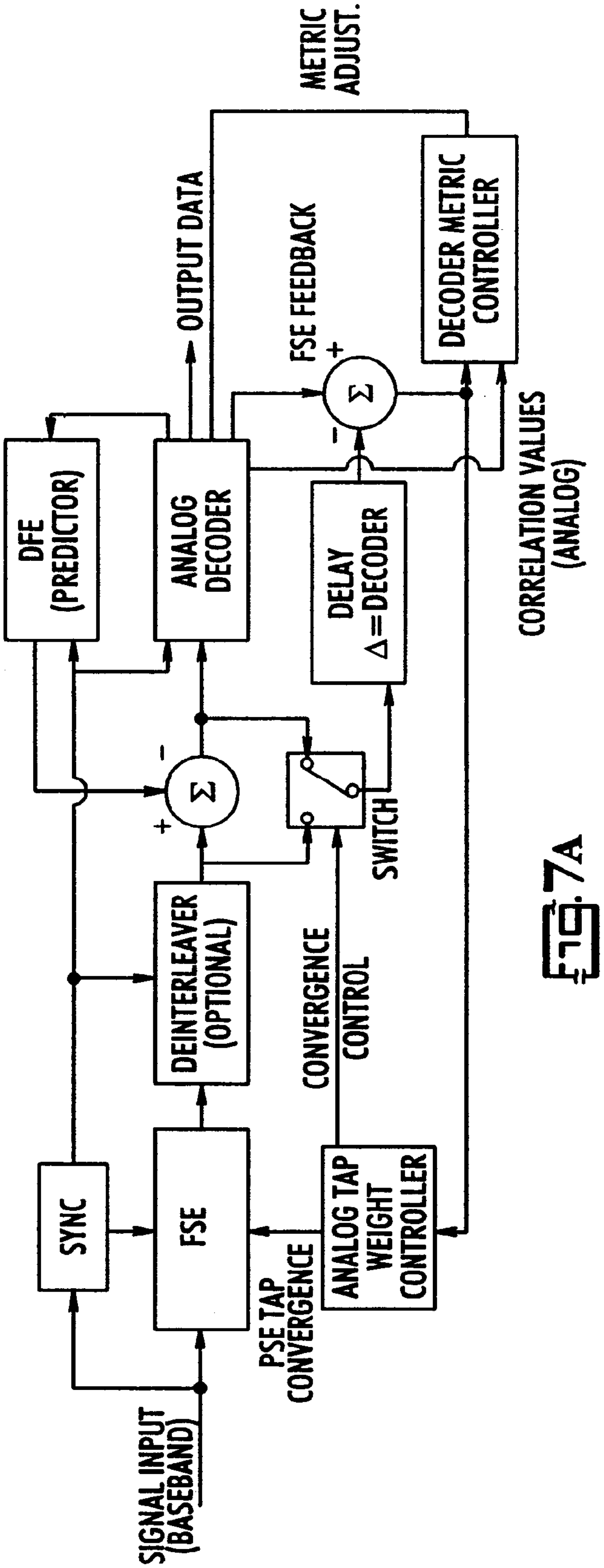
FIG. 7*a*–7*e* are (FIGS. 7*a*-7*c*) block diagrams of preferred receiver-system implementations for both non-spread and spread types of signals, plus (FIGS. 7*d*-7*e*) details of the modulation-constellation analyzer subsystem optionally contained therein.
Figure 7B:
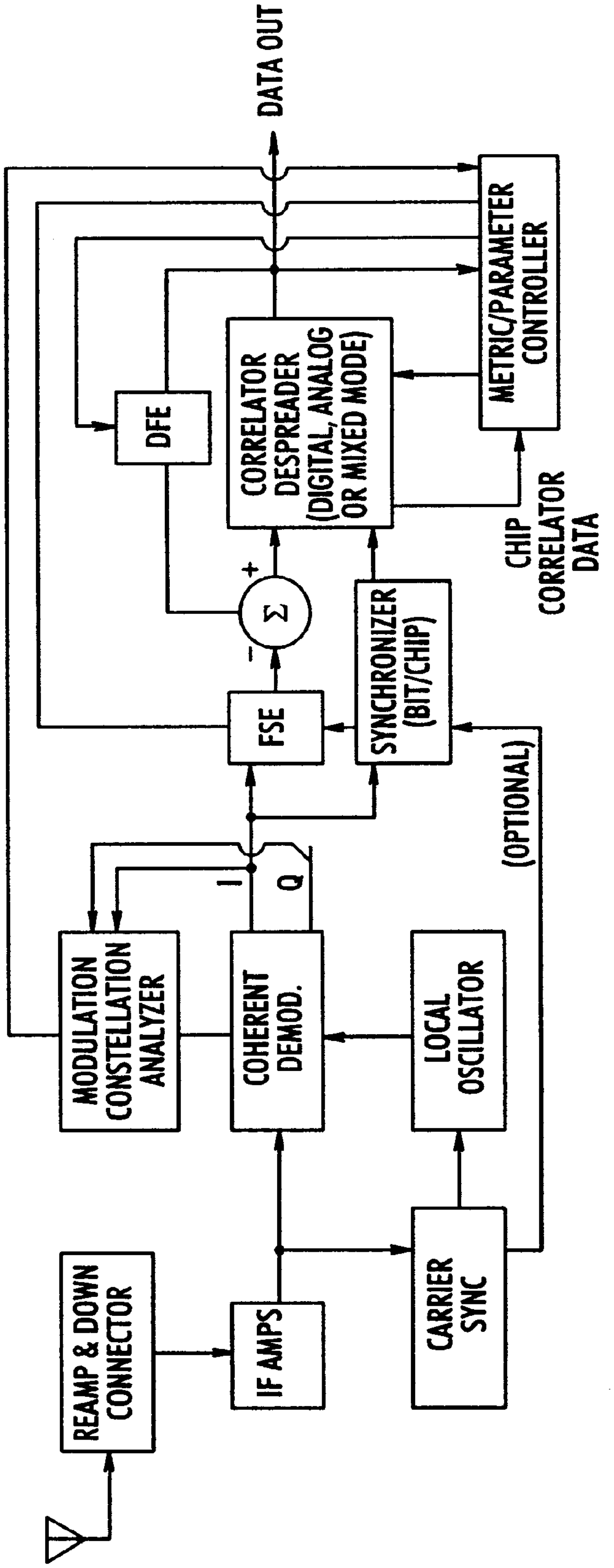
Figure 7C:
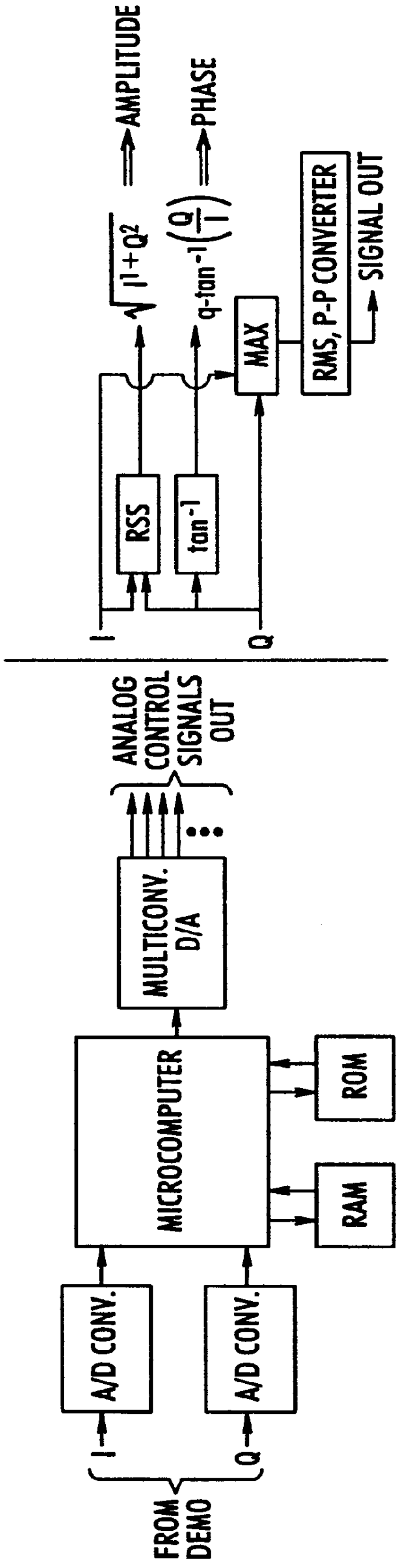
Figure 7D:
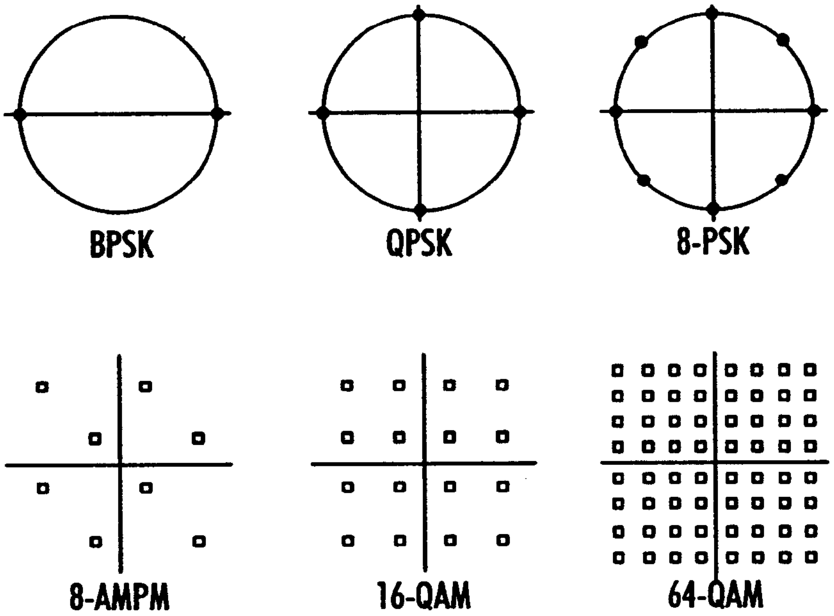
Figure 7E:
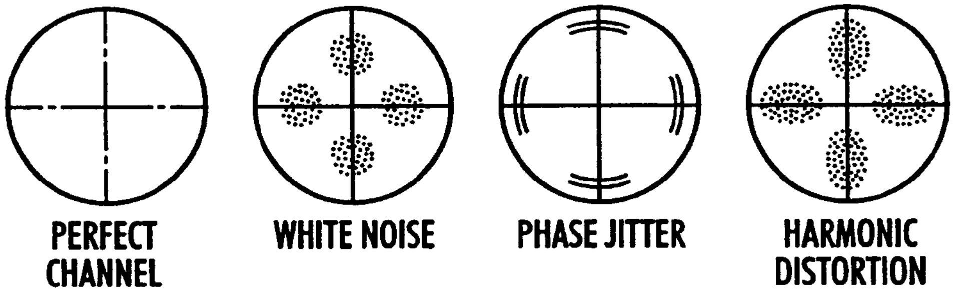
Figure 8:
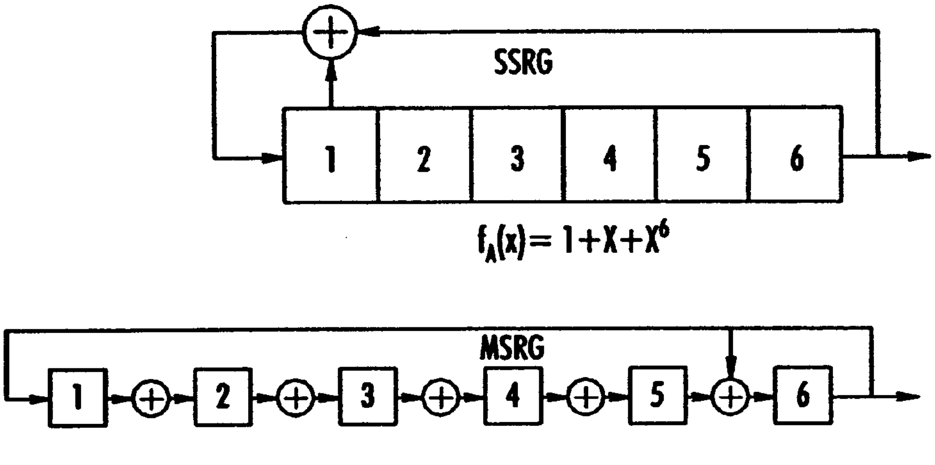
FIG. 8 details two implementations of maximal-length sequence (MLS) PN generators.

FIG. 7*a* provides a block diagram for a baseband receiver equalizer/decoder implementation of the instant invention with dynamic feedback-based parameter control of both forward-path and DFE units via analog-decoded data and explicitly calculated tap values based on the detailed correlation information derived in the decoder block. The Viterbi decoder is also dynamically optimized "on the fly" via continuous adjustments to the values used in the bit- and path-metric computations. The scenario of FIG. 7*b* is specifically tailored for BPSK spread-spectrum signal reception; here, the receiver uses a coherent demodulator to extract the baseband in-phase (I) and quadrature (Q) modulation components, although for BPSK only the I signal is needed for decoding. However, both signals are of interest when feeding the Modulation-Constellation Analyzer block shown in the diagram. Typical modulation constellation patterns, well known in the art for mathematical signal description purposes, can also be employed in the dynamic analysis of signal degradations within the receiver system to direct various upstream and/or downstream signal-correcting operations, including the optimization of equalizers and the decoder circuitry and jitter reduction in the synchronizer loops for carrier, PN code, and data recovery. FIG. 7*c* depicts both digital- and analog-based implementations of the modulation-constellation analysis block. The digital approach simply converts the I and Q signals into adequately high-resolution digitized words (typically 12 or more bits of quantization), which are then inputted to a software and/or hardware-programmed microcomputer or processor, which then computes, compares, and stores the pertinent signal parameters (e.g., I and Q amplitudes, relative phases, RMS and peak noise/uncertainty levels about each constellation point, constellation size and phase variations, distortions, and pattern skew [usually indicative of multipath or other phase nonlinearities in the signal]). It is most useful to store these data points for each modulation state to facilitate the acquisition of running assessments therefrom of overall signal quality. FIG. 7*d* provides standard constellation or "signal-space" plots of several popular digital modulation formats, where the axes are the I and Q components, respectively. Note that the phase-modulated formats such as QPSK and 8-PSK have approximately constant amplitudes, as depicted by their constant radii. FIG. 7*e* illustrates several typical channel impairments on a reference QPSK signal. It is these sorts of effects that the instant invention addresses by assessing the types and magnitudes of signal degradations (i.e., noise, multipath, phase jitter) as depicted in the diagrams.

Figure 2B:
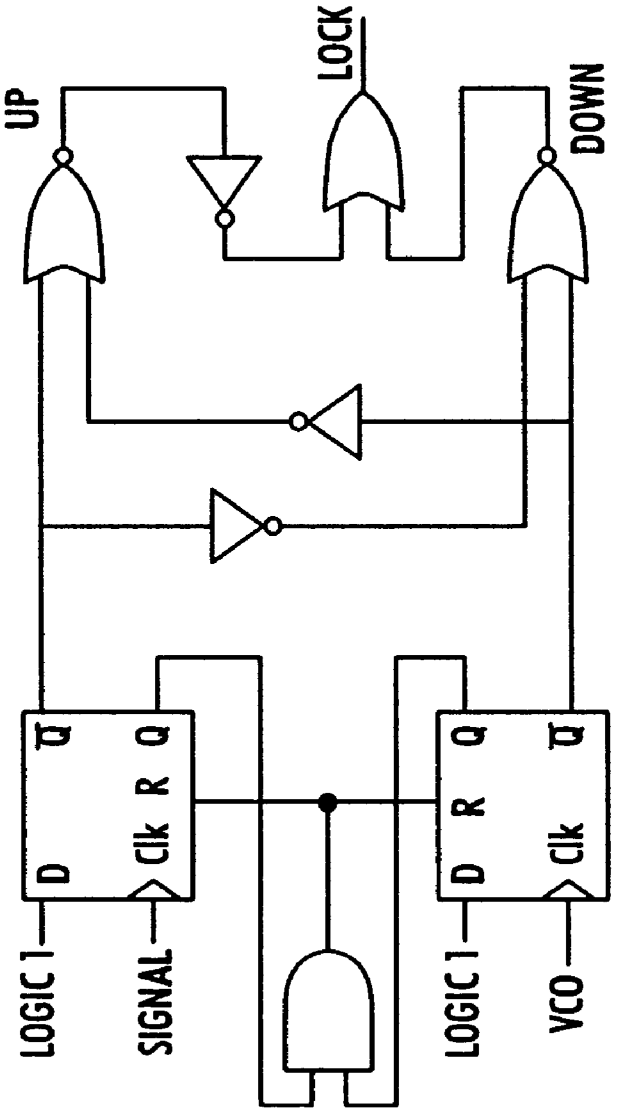

Additional novelty in the design of the "Fast-Synchronizing" receiver system lies in the use of a specialized demodulator for BPSK signals. With reference back to FIG. 2, the equalized signal enters a PLL block consisting of a phase-frequency detector (PFD) 20, low-pass filter (LPF) 50 and a voltage-controlled oscillator (VCO) 52. The PLL is an electronic circuit for locking an oscillator, such as a VCO, in phase with an arbitrary input signal which is employed to track a carrier or synchronizing signal which may vary in frequency with time. Performance of the PLL is dependent on the circuit or loop's ability to instantaneously control the frequency and/or phase of the VCO 52 output. In the present invention, a PFD-type detector is required for this application due to its inherent characteristic of an accurate 0-degree phase offset when locked.

The output of the VCO 52 is multiplied with an incoming RF signal or alternately, an intermediate-frequency (IF), using a high-speed Gilbert-cell type XOR gate 18. The output of XOR 18 is the baseband spread-spectrum data signal. The baseband signal from XOR 18 is XORed with the VCO 52 output at XOR 22 to control the −180 degree phase shift of the VCO 52 signal going to the PFD 20. Thus, the VCO 52 always runs at a constant phase and frequency when locked to the incoming signal 10, which is preferably a BPSK signal. It should be observed by those experienced in the art that two of these circuits operated in quadrature (90-degree phase-shifted) could be employed to detect QPSK. (In accordance with the known art, QAM or other quadrature modulations could also be handled with some additional processing circuitry).

The signal 10 then passes through a conventional clock recovery circuit 24 (or "chip clock") that derives the rising clock edge which will be used for despreading the data. The spread-spectrum signal and the chip clock 24 signal are then passed to the digital portion 26 of the circuit that accomplishes synchronization and tracking.

When a transmission begins, the digital circuitry 26 performs a synchronization function. In synchronization mode, the "chips" are sequential loaded by the chip clock 24 into the N shift registers, for example 54, 55, 56 and 57, also shown as registers 1 through 2N. Once the registers are all loaded from the incoming signal 10', the logic begins comparing the locally generated N+1 chip with the incoming N+1 chip via summing element 60. If the output of summing element 60 and XOR 18 agree consecutively on a predetermined number of chips, then the signal is declared synchronized and the multiplexer (not shown) switches the input of shift register, for example register 54, from the incoming signal to the output of the locally generated code generator via a switching element 58.

When synchronization is successful, the digital circuitry 26 then performs a tracking function. In the tracking stage or mode, the output of the modulo-2 summer 27 is used to PSK-modulate the VCO 52 output, producing a signal $R_{ref}(t)$ that is identical to the incoming signal except that the information bits of the local signal 62 are always a logic "1". Combining the locally modulated signal 62 with the incoming $R_{ref}(t)$ signal via XOR gate 29 directly yields the baseband data stream 28, which is a synchronized spread-spectrum signal. Key to the effectiveness of the instant invention is the property of Gold-code sequences that selected polynomials possess quite small cross-correlation values compared with their autocorrelations. Gold codes require relatively little logic to generate and are convenient for this application, although other sets of codes (i.e., Kasami) may also be employed. A typical 63-length Gold-code generator circuit, useful for RF applications, has two sets of six flip-flops, each of which is used to generate independent maximal-length sequences (MLSs). The circuit also has the capability to exclusive-or (XOR) the two MLSs together to form a family of Gold sequences. The two generating polynomials are $f_A=1+X+X^6$ and $f_B=1+X+X^2+X^5+X^6$. These two codes are each irreducible and were chosen using Gold's preferred-pair algorithm, so that several codes could be synthesized without changing the feedback taps. These preferred pairs yield bounded cross-correlation values of $q_{max}=2^{[(M+2)/2]}+1=17$. In addition to the two straight MLSs, there are $n=2^m-1=63$ Gold sequences available. The textbook method of generating these n sequences is to XOR $f_A(x)$ with delayed versions of $f_B(x\text{-}t)$ where t e {0, . . . , n} represents the shift between the two MLSs.

However, a simpler hardware method for generating the different codes is to simulate the shifts by initializing one of the MLSs with different start bits. In our case we use a starting word of 111111 for $f_A$. For $f_B$ we use either an internal start word of 111111 or an external user set start word. The external word occupies six pins and can be any value from all 0's to all 1's.

The following diagram shows the hardware implementation of $f_A$ using both the multiple-tap simple sequence generator (SSRG) and the modular multiple-tap sequence generator (MSRG).

Figure 9:
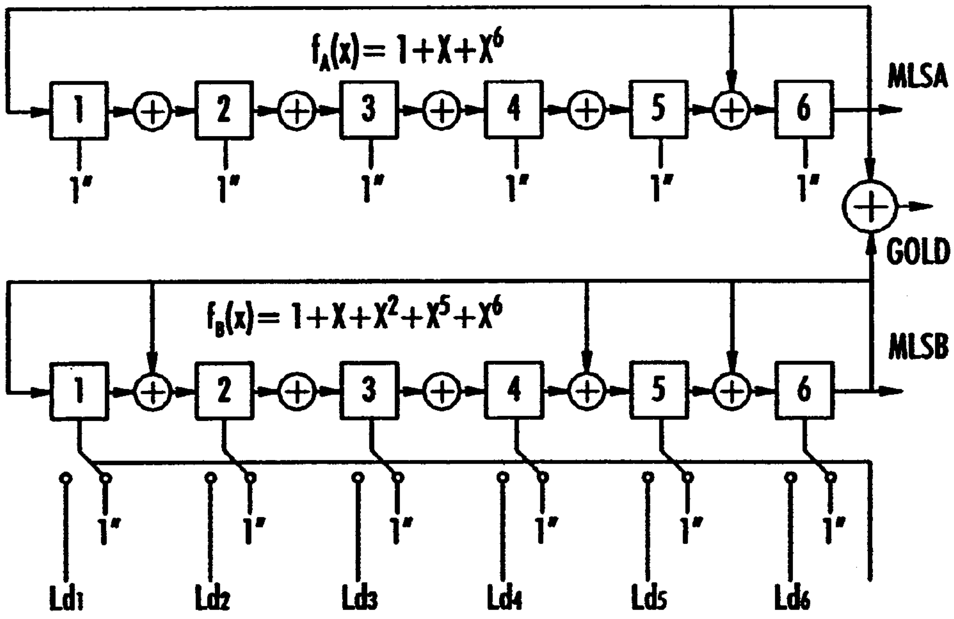
FIG. 9 is a block diagram of a gold-type PN code generator.

The total PN generator setup is shown in FIG. 9. FIG. 9 requires at least 10 external ports—one for each of the MLS outputs, one for the Gold code output, six for the presets for $f_B$, and one port to select internal or external presets for $f_b$. Predicting the next bits in the sequence is as simple as following the algorithm for the selected polynomial.

Tables 1 and 2 show MLS "A" (column 0) and the 63 Gold sequences. These tables will allow the hardware designer to check the simulated or hardware outputs. Each table shows one sequence per column. The number at the heading of the column represents the decimal value of the preset word Ld1–Ld6, where Ld6 is the LSB and Ld1 is the MSB.

It is thus seen that a novel receiver for quickly synchronizing to a spread-spectrum signal has been described. The receiver of the present invention is channel-adaptive, and uses mixed-signal blocks on the same CMOS chip, thus (for an N-chip code) requiring only 2N shift registers and very few additional gates. The receiver also utilizes delay-line equalizers and Viterbi-type data decoders for higher system performance with lower power and reduced IC footprint. Additionally, the required clock rates are equivalent to the spread-spectrum bit rate rather than N times that speed.

It will be readily understood by those persons skilled in the art that the present invention is capable of broad utility and application. Many embodiments and adaptations of the present invention other than those described, as well as many variations, modifications and equivalent arrangements will be apparent from or reasonably suggested by the present invention and foregoing description thereof, without departing from the substance or scope of the present invention as defined by the following appended claims.

What is claimed is:

1. A fast-synchronizing receiver for receiving a spread-spectrum input signal comprising:

- equalizer means for correcting deficiencies in an input signal;
- despreader means in operational connection with said equalizer means for converting said spread-spectrum input signal to baseband form;
- synchronization means in operational connection with said despreader means for determining the start of said spread-spectrum input signal; and
- decoder means in operational connection with said despreader means for determining the contents of said spread-spectrum input signal, wherein said synchronizing means comprises:
  - a plurality of incoming shift registers adapted to store a plurality of chips from an incoming signal;
  - loading means for sequentially loading said incoming shift registers with chips of an incoming signal;
  - predicting means in operable connection with said plurality of shift registers for predicting the next chip to be loaded by said loading means; and
  - comparing means for comparing said predicting means with the chip loaded by said loading means;
  - completion means in operable connection with said comparing means for determining when a predetermined number of consecutive number of comparisons agree.

2. The receiver as recited in claim 1, wherein the maximum number of incoming shift registers is 2N, where N is a highest power term of a generator polynomial.

3. A fast-synchronizing receiver for receiving a spread-spectrum input signal comprising:

- an equalizer having
  - a plurality of feed-forward analog memory elements with a plurality of corresponding feed-forward weighting elements, wherein the value stored in each feed-forward analog memory element of said plurality of feed-forward analog memory elements is multiplied by a corresponding feed-forward weighting element,
  - a plurality of feedback analog memory elements with a plurality of corresponding feedback weighting elements, wherein the value stored in each feedback analog memory element of said plurality of feedback analog memory elements is multiplied by a corresponding feedback weighting element, and
  - summing means for summing said feed-forward analog memory elements with said feedback analog memory elements;
- despreader means in operational connection with said equalizer means for converting said spread-spectrum input signal to baseband form;

synchronization means in operational connection with said despreader means for determining the start of said spread-spectrum input signal; and decoder means in operational connection with said despreader means for determining the contents of said spread-spectrum input signal, wherein said synchronizing means comprises:

a plurality of incoming shift registers adapted to store a plurality of chips from an incoming signal;

loading means for sequentially loading said incoming shift registers with chips of an incoming signal;

predicting means in operable connection with said plurality of shift registers for predicting the next chip to be loaded by said loading means; and comparing means for comparing said predicting means with the chip loaded by said loading means;

completion means in operable connection with said comparing means for determining when a predetermined number of consecutive number of comparisons agree.

4. The receiver as recited in claim 3, wherein the maximum number of incoming shift registers is 2N, where N is a highest power term of a generator polynomal.

5. A fast-synchronizing receiver for receiving a spread-spectrum input signal comprising:

an equalizer having a plurality of feed-forward analog memory elements with a plurality of corresponding feed-forward weighting elements, wherein the value stored in each feed-forward analog memory element of said plurality of feed-forward analog memory elements is multiplied by a corresponding feed-forward weighting element, a plurality of feedback analog memory elements with a plurality of corresponding feedback weighting elements, wherein the value stored in each feedback analog memory element of said plurality of feedback analog memory elements is multiplied by a corresponding feedback weighting element, and summing means for summing said feed-forward analog memory elements with said feedback analog memory elements;

despreader means in operational connection with said equalizer for converting said spread-spectrum input signal to baseband form;

a plurality of incoming shift registers adapted to store a plurality of chips from an incoming signal;

loading means for sequentially loading said incoming shift registers with chips of an incoming signal;

predicting means in operable connection with said plurality of shift registers for predicting the next chip to be loaded by said loading means;

comparing means for comparing said predicting means with the chip loaded by said loading means;

completion means in operable connection with said comparing means for determining when a predetermined number of consecutive number of comparisons agree; and decoder means in operational connection with said despreader means for determining the contents of said spread-spectrum input signal.

6. The receiver as recited in claim 5, wherein said feed-forward analog memory elements are switched-capacitor delay lines.

7. The receiver as recited in claim 5, wherein said feed-forward analog memory elements are initialized based upon a predetermined estimate of RF channel characteristics.

8. The receiver as recited in claim 5, wherein said feed-forward weighting element multiplies a delay element by a value between −1 and +1.

9. The receiver as recited in claim 5, wherein said summing means is a summing transistor network.

10. The receiver as recited in claim 5, wherein said feedback weighting elements are controlled by a neural network.

11. The receiver as recited in claim 5, wherein said feedback weighting elements are controlled by an analog neural network.

12. The receiver as recited in claim 5, wherein said feedback weighting elements are controlled by an analog array network.

13. The receiver as recited in claim 5, further comprising a monolithic substrate and wherein said equalizer resides on said monolithic substrate.

14. The receiver as recited in claim 5, wherein said spread-spectrum input signal is a PSK signal, further comprising a demodulator circuit in operable connection with said equalizer and said synchronization means, said demodulator circuit having a phase frequency detector in operable connection with said equalizer, a lowpass filter in operable connection with said equalizer, a first exclusive-or gate having a first input and a first output, a second exclusive-or gate having a second input and a second output, and a voltage-controlled oscillator wherein said voltage-controlled oscillator is in operable connection with said first input of said first exclusive-or gate and said second input of said second exclusive-or gate, said first output of said first exclusive-or gate in operable connection with said second input of said second exclusive-or gate.

15. The receiver as recited in claim 5, wherein said equalizer corrects individual chips in said spread-spectrum input signal.

16. The receiver as recited in claim 5, wherein said feedback weighting element is controlled by a sensor-type analog neural network.

17. An apparatus, comprising a fast-synchronizing receiver for receiving a spread-spectrum input signal including:

an equalizer having a plurality of feed-forward memory elements with a plurality of corresponding feed-forward weighting elements, wherein the value stored in each feed-forward memory element of the plurality of feed-forward memory elements is multiplied by a corresponding feed-forward weighting element, a plurality of feedback memory elements with a plurality of corresponding feedback weighting elements, wherein the value stored in each feedback memory element of the plurality of feedback memory elements is multiplied by a corresponding feedback weighting element, and a summing circuit for summing the feed-forward memory elements with the feedback memory elements;

a despreader circuit in operational connection with the equalizer circuit for converting the spread-spectrum input signal to baseband form;

a plurality of incoming shift registers adapted to store a plurality of chips from an incoming signal;

a loading circuit for sequentially loading the incoming shift registers with chips of an incoming signal;

a predicting circuit in operable connection with the plurality of shift registers for predicting the next chip to be loaded by the loading circuit;

a comparing circuit for comparing the predicting circuit with the chip loaded by the loading circuit;

a completion circuit in operable connection with the comparing circuit for determining when a predetermined number of consecutive number of comparisons agree; and a decoder circuit in operational connection with the despreader circuit for determining the contents of the spread-spectrum input signal.

18. The receiver as recited in claim 17, wherein the feed-forward weighting elements are controlled by a neural network.

19. The receiver as recited in claim 17, wherein the feed-forward memory elements are switched-capacitor delay lines.

20. The receiver as recited in claim 17, wherein the feed-forward memory elements are initialized based upon a predetermined estimate of RF channel characteristics.

21. The receiver as recited in claim 17, wherein the feed-forward weighting element multiplies a delay element by a value between −1 and +1.

22. The receiver as recited in claim 17, wherein the decoder circuit uses channel-adaptive path metrics to optimize a Viterbi algorithm.

23. The receiver as recited in claim 17, wherein the summing circuit is a summing transistor network.

24. The receiver as recited in claim 17, wherein the feedback weighting elements are controlled by a neural network.

25. The receiver as recited in claim 17, wherein the feedback weighting elements are controlled by an analog neural network.

26. The receiver as recited in claim 17, wherein said feedback weighting elements are controlled by an analog array network.

27. The receiver as recited in claim 17, further comprising a monolithic substrate and wherein the equalizer resides on the monolithic substrate.

28. The receiver as recited in claim 17, wherein the spread-spectrum input signal includes a PSK signal, further comprising a demodulator circuit in operable connection with the equalizer and the synchronization circuit, the demodulator circuit having a phase frequency detector in operable connection with the equalizer, a lowpass filter in operable connection with the equalizer, a first exclusive-or gate having a first input and a first output, a second exclusive-or gate having a second input and a second output, and a voltage-controlled oscillator wherein the voltage-controlled oscillator is in operable connection with the first input of the first exclusive-or gate and the second input of the second exclusive-or gate, the first output of the first exclusive-or gate in operable connection with the second input of the second exclusive-or gate.

29. The receiver as recited in claim 17, wherein the equalizer corrects individual chips in the spread-spectrum input signal.

30. The receiver as recited in claim 17, wherein the feedback weighting element is controlled by a sensor-type neural network.

31. A method, comprising receiving a spread-spectrum input signal with a fast-synchronizing receiver including:

multiplying a value stored in each of a plurality of feed-forward memory elements of an equalizer by a corresponding feed-forward weighting element, multiplying a value stored in each of a plurality of feedback memory elements of the equalizer by a corresponding feedback weighting element;

summing the feed-forward memory elements with the feedback memory elements using a summer of the equalizer;

converting the spread-spectrum input signal to baseband form using a despreader in operational connection with the equalizer;

storing a plurality of chips from an incoming signal using a plurality of incoming shift registers;

sequentially loading the incoming shift registers with chips of an incoming signal using a loader;

predicting the next chip to be loaded by the loader using a predicting circuit in operable connection with the plurality of shift registers;

comparing the predictor with the chip loaded by the loader using a comparator;

determining when a predetermined number of consecutive number of comparisons agree using a completer in operable connection with the comparator; and determining the contents of the spread-spectrum input signal using a decoder in operational connection with the despreader.

32. The method of claim 31, further comprising controlling the feed-forward weighting elements using a neural network.

33. The method of claim 31, wherein multiplying the value stored in each of the plurality of feed-forward memory elements includes multiplying the value stored in each of a plurality of switched-capacitor delay lines.

34. The method of claim 31, further comprising initializing the feed-forward memory elements using a predetermined estimate of RF channel characteristics.

35. The method of claim 31, wherein multiplying the value stored in each of the plurality of feed-forward memory elements of the equalizer by the corresponding feed-forward weighting element includes each of the feed-forward weighting element multiplying a delay element by a value between −1 and +1.

36. The method of claim 31, wherein determining the contents of the spread-spectrum input signal using the decoder includes optimizing a Viterbi algorithm using channel-adaptive path metrics.

37. The method of claim 31, wherein summing includes summing using a summing transistor network.

38. The method of claim 31, further comprising controlling the feedback weighting elements using a neural network.

39. The method of claim 31, further comprising controlling the feedback weighting elements using an analog neural network.

40. The method of claim 31, wherein said feedback weighting elements are controlled by an analog array network.

41. The method of claim 31, wherein the spread spectrum input signal includes a PSK signal.

42. The method of claim 31, further comprising correcting individual chips in the spread-spectrum input signal using the equalizer.

43. The method of claim 31, further comprising controlling the feedback weighting elements using a sensor-type neural network.

* * * * *

UNITED STATES PATENT AND TRADEMARK OFFICE

CERTIFICATE OF CORRECTION

PATENT NO. : 6,744,806 B1

APPLICATION NO. : 09/660743

DATED : June 1, 2004

INVENTOR(S) : Michael Roy Moore, Stephen Fulton Smith and Michael Steven Emery

It is certified that error appears in the above-identified patent and that said Letters Patent is hereby corrected as shown below:

Please insert the following first half of Table 1 at column 16 after line 14 and before line 15

| [illegible] | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 1 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 |
| 2 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 |
| 3 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 |
| 4 | 0 | 1 | 0 | 1 | 1 | 0 | 1 | 0 | 1 | 0 | 1 | 0 | 0 | 1 | 0 | 1 | 0 | 1 | 0 | 1 | 1 | 0 | 1 | 0 | 1 | 0 | 1 | 0 | 0 | 1 | 0 | 1 |
| 5 | 1 | 0 | 0 | 1 | 1 | 0 | 0 | 1 | 0 | 1 | 1 | 0 | 0 | 1 | 1 | 0 | 0 | 1 | 1 | 0 | 0 | 1 | 1 | 0 | 1 | 0 | 0 | 1 | 1 | 0 | 0 | 1 |
| 6 | 0 | 1 | 1 | 0 | 1 | 0 | 0 | 1 | 0 | 1 | 1 | 0 | 1 | 0 | 0 | 1 | 1 | 0 | 0 | 1 | 0 | 1 | 1 | 0 | 1 | 0 | 0 | 1 | 0 | 1 | 1 | 0 |
| 7 | 1 | 1 | 0 | 0 | 0 | 0 | 1 | 1 | 0 | 0 | 1 | 1 | 1 | 1 | 0 | 0 | 1 | 1 | 0 | 0 | 0 | 0 | 1 | 1 | 0 | 0 | 1 | 1 | 1 | 1 | 0 | 0 |
| 8 | 1 | 1 | 1 | 1 | 0 | 0 | 0 | 0 | 0 | 0 | 0 | 0 | 1 | 1 | 1 | 1 | 0 | 0 | 0 | 0 | 1 | 1 | 1 | 1 | 1 | 1 | 1 | 1 | 0 | 0 | 0 | 0 |
| 9 | 0 | 1 | 0 | 1 | 0 | 1 | 0 | 1 | 1 | 0 | 1 | 0 | 1 | 0 | 1 | 0 | 1 | 0 | 1 | 0 | 1 | 0 | 1 | 0 | 0 | 1 | 0 | 1 | 0 | 1 | 0 | 1 |
| 10 | 0 | 1 | 1 | 0 | 0 | 1 | 1 | 0 | 0 | 1 | 1 | 0 | 0 | 1 | 1 | 0 | 1 | 0 | 0 | 1 | 1 | 0 | 0 | 1 | 1 | 0 | 0 | 1 | 1 | 0 | 0 | 1 |
| 11 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 |
| 12 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 |
| 13 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 |
| 14 | 1 | 0 | 1 | 0 | 1 | 0 | 1 | 0 | 1 | 0 | 1 | 0 | 1 | 0 | 1 | 0 | 0 | 1 | 0 | 1 | 0 | 1 | 0 | 1 | 0 | 1 | 0 | 1 | 0 | 1 | 0 | 1 |
| 15 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 |
| 16 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 |
| 17 | 0 | 0 | 1 | 1 | 1 | 1 | 0 | 0 | 1 | 1 | 0 | 0 | 0 | 0 | 1 | 1 | 0 | 0 | 1 | 1 | 1 | 1 | 0 | 0 | 1 | 1 | 0 | 0 | 0 | 0 | 1 | 1 |
| 18 | 1 | 0 | 1 | 0 | 0 | 1 | 0 | 1 | 0 | 1 | 0 | 1 | 1 | 0 | 1 | 0 | 0 | 1 | 0 | 1 | 1 | 0 | 1 | 0 | 1 | 0 | 1 | 0 | 0 | 1 | 0 | 1 |
| 19 | 1 | 1 | 0 | 0 | 1 | 1 | 0 | 0 | 0 | 0 | 1 | 1 | 0 | 0 | 1 | 1 | 0 | 0 | 1 | 1 | 0 | 0 | 1 | 1 | 1 | 1 | 0 | 0 | 1 | 1 | 0 | 0 |
| 20 | 0 | 1 | 0 | 1 | 1 | 0 | 1 | 0 | 0 | 1 | 0 | 1 | 1 | 0 | 1 | 0 | 1 | 0 | 1 | 0 | 0 | 1 | 0 | 1 | 1 | 0 | 1 | 0 | 0 | 1 | 0 | 1 |
| 21 | 1 | 0 | 0 | 1 | 1 | 0 | 0 | 1 | 0 | 1 | 1 | 0 | 0 | 1 | 1 | 0 | 1 | 0 | 0 | 1 | 1 | 0 | 0 | 1 | 0 | 1 | 1 | 0 | 0 | 1 | 1 | 0 |
| 22 | 0 | 1 | 1 | 0 | 1 | 0 | 0 | 1 | 0 | 1 | 1 | 0 | 1 | 0 | 0 | 1 | 1 | 0 | 0 | 1 | 0 | 1 | 1 | 0 | 1 | 0 | 0 | 1 | 0 | 1 | 1 | 0 |
| 23 | 0 | 1 | 1 | 0 | 1 | 0 | 0 | 1 | 1 | 0 | 0 | 1 | 0 | 1 | 1 | 0 | 0 | 1 | 1 | 0 | 1 | 0 | 0 | 1 | 1 | 0 | 0 | 1 | 0 | 1 | 1 | 0 |
| 24 | 1 | 0 | 0 | 1 | 0 | 1 | 1 | 0 | 0 | 1 | 1 | 0 | 1 | 0 | 0 | 1 | 0 | 1 | 1 | 0 | 1 | 0 | 0 | 1 | 1 | 0 | 0 | 1 | 0 | 1 | 1 | 0 |
| 25 | 0 | 1 | 1 | 0 | 1 | 0 | 0 | 1 | 1 | 0 | 0 | 1 | 0 | 1 | 1 | 0 | 1 | 0 | 0 | 1 | 0 | 1 | 1 | 0 | 0 | 1 | 1 | 0 | 1 | 0 | 0 | 1 |
| 26 | 0 | 0 | 1 | 1 | 1 | 1 | 0 | 0 | 1 | 1 | 0 | 0 | 0 | 0 | 1 | 1 | 1 | 1 | 0 | 0 | 0 | 0 | 1 | 1 | 0 | 0 | 1 | 1 | 1 | 1 | 0 | 0 |
| 27 | 1 | 0 | 1 | 0 | 0 | 1 | 0 | 1 | 0 | 1 | 0 | 1 | 1 | 0 | 1 | 0 | 0 | 1 | 0 | 1 | 1 | 0 | 1 | 0 | 1 | 0 | 1 | 0 | 0 | 1 | 0 | 1 |
| 28 | 1 | 0 | 0 | 1 | 1 | 0 | 0 | 1 | 0 | 1 | 1 | 0 | 0 | 1 | 1 | 0 | 0 | 1 | 1 | 0 | 0 | 1 | 1 | 0 | 1 | 0 | 0 | 1 | 1 | 0 | 0 | 1 |
| 29 | 1 | 1 | 0 | 0 | 0 | 0 | 1 | 1 | 1 | 1 | 0 | 0 | 0 | 0 | 1 | 1 | 0 | 0 | 1 | 1 | 1 | 1 | 0 | 0 | 0 | 0 | 1 | 1 | 1 | 1 | 0 | 0 |
| 30 | 0 | 1 | 0 | 1 | 1 | 0 | 1 | 0 | 1 | 0 | 1 | 0 | 0 | 1 | 0 | 1 | 0 | 1 | 1 | 0 | 1 | 0 | 1 | 0 | 1 | 0 | 0 | 1 | 0 | 1 | 0 | 1 |
| 31 | 0 | 0 | 1 | 1 | 0 | 0 | 1 | 1 | 1 | 1 | 0 | 0 | 1 | 1 | 0 | 0 | 1 | 1 | 0 | 0 | 1 | 1 | 0 | 0 | 0 | 0 | 1 | 1 | 0 | 0 | 1 | 1 |

UNITED STATES PATENT AND TRADEMARK OFFICE

CERTIFICATE OF CORRECTION

PATENT NO. : 6,744,806 B1
APPLICATION NO. : 09/660743
DATED : June 1, 2004

INVENTOR(S) : Michael Roy Moore, Stephen Fulton Smith and Michael Steven Emery

It is certified that error appears in the above-identified patent and that said Letters Patent is hereby corrected as shown below:

Please insert the following second half of Table 1 at column 16 after line 14 and before line 15

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 32 | 0 | 0 | 0 | 0 | 1 | 1 | 1 | 1 | 0 | 0 | 0 | 0 | 1 | 1 | 1 | 1 | 1 | 1 | 1 | 1 | 0 | 0 | 0 | 0 | 1 | 1 | 1 | 1 | 0 | 0 | 0 | 0 |
| 33 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 |
| 34 | 0 | 1 | 0 | 1 | 0 | 1 | 0 | 1 | 0 | 1 | 0 | 1 | 0 | 1 | 0 | 1 | 1 | 0 | 1 | 0 | 1 | 0 | 1 | 0 | 1 | 0 | 1 | 0 | 1 | 0 | 1 | 0 |
| 35 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 |
| 36 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 |
| 37 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 |
| 38 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| 39 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 40 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 41 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 |
| 42 | 0 | 1 | 1 | 0 | 0 | 1 | 1 | 0 | 1 | 0 | 0 | 1 | 1 | 0 | 0 | 1 | 0 | 1 | 1 | 0 | 0 | 1 | 1 | 0 | 1 | 0 | 0 | 1 | 1 | 0 | 0 | 1 |
| 43 | 1 | 1 | 0 | 0 | 0 | 0 | 1 | 1 | 1 | 1 | 0 | 0 | 0 | 0 | 1 | 1 | 0 | 0 | 1 | 1 | 1 | 1 | 0 | 0 | 0 | 0 | 1 | 1 | 1 | 1 | 0 | 0 |
| 44 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 |
| 45 | 0 | [illegible] | 0 | 1 | 0 | 1 | 0 | 1 | 1 | 0 | 1 | 0 | 1 | 0 | 1 | 0 | 1 | 0 | 1 | 0 | 1 | 0 | 1 | 0 | 0 | 1 | 0 | 1 | 0 | 1 | 0 | 1 |
| 46 | 0 | 0 | 1 | 1 | 0 | 0 | 1 | 1 | 0 | 0 | 1 | 1 | 0 | 0 | 1 | 1 | 1 | 1 | 0 | 0 | 1 | 1 | 0 | 0 | 1 | 1 | 0 | 0 | 1 | 1 | 0 | 0 |
| 47 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 |
| 48 | 1 | 1 | 0 | 0 | 1 | 1 | 0 | 0 | 0 | 0 | 1 | 1 | 0 | 0 | 1 | 1 | 1 | 1 | 0 | 0 | 1 | 1 | 0 | 0 | 0 | 0 | 1 | 1 | 0 | 0 | 1 | 1 |
| 49 | 0 | 1 | 0 | 1 | 1 | 0 | 1 | 0 | 0 | 1 | 0 | 1 | 1 | 0 | 1 | 0 | 1 | 0 | 1 | 0 | 0 | 1 | 0 | 1 | 1 | 0 | 1 | 0 | 0 | 1 | 0 | 1 |
| 50 | 0 | 0 | 1 | 1 | 0 | 0 | 1 | 1 | 1 | 1 | 0 | 0 | 1 | 1 | 0 | 0 | 0 | 0 | 1 | 1 | 0 | 0 | 1 | 1 | 1 | 1 | 0 | 0 | 1 | 1 | 0 | 0 |
| 51 | 0 | 0 | 0 | 0 | 1 | 1 | 1 | 1 | 0 | 0 | 0 | 0 | 1 | 1 | 1 | 1 | 1 | 1 | 1 | 1 | 0 | 0 | 0 | 0 | 1 | 1 | 1 | 1 | 0 | 0 | 0 | 0 |
| 52 | 0 | 1 | 0 | 1 | 0 | 1 | 0 | 1 | 1 | 0 | 1 | 0 | 1 | 0 | 1 | 0 | 0 | 1 | 0 | 1 | 0 | 1 | 0 | 1 | 1 | 0 | 1 | 0 | 1 | 0 | 1 | 0 |
| 53 | 1 | 1 | 0 | 0 | 1 | 1 | 0 | 0 | 1 | 1 | 0 | 0 | 1 | 1 | 0 | 0 | 0 | 0 | 1 | 1 | 0 | 0 | 1 | 1 | 0 | 0 | 1 | 1 | 0 | 0 | 1 | 1 |
| 54 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| 55 | 0 | 1 | 0 | 1 | 0 | 1 | 0 | 1 | 1 | 0 | 1 | 0 | 1 | 0 | 1 | 0 | 0 | 1 | 0 | 1 | 0 | 1 | 0 | 1 | 1 | 0 | 1 | 0 | 1 | 0 | 1 | 0 |
| 56 | 0 | 1 | 1 | 0 | 0 | 1 | 1 | 0 | 0 | 1 | 1 | 0 | 0 | 1 | 1 | 0 | 1 | 0 | 0 | 1 | 1 | 0 | 0 | 1 | 1 | 0 | 0 | 1 | 1 | 0 | 0 | 1 |
| 57 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 |
| 58 | 0 | 1 | 1 | 0 | 1 | 0 | 0 | 1 | 1 | 0 | 0 | 1 | 0 | 1 | 1 | 0 | 0 | 1 | 1 | 0 | 1 | 0 | 0 | 1 | 1 | 0 | 0 | 1 | 0 | 1 | 1 | 0 |
| 59 | 1 | 1 | 0 | 0 | 0 | 0 | 1 | 1 | 0 | 0 | 1 | 1 | 1 | 1 | 0 | 0 | 0 | 0 | 1 | 1 | 1 | 1 | 0 | 0 | 1 | 1 | 0 | 0 | 0 | 0 | 1 | 1 |
| 60 | 1 | 1 | 1 | 1 | 0 | 0 | 0 | 0 | 0 | 0 | 0 | 0 | 1 | 1 | 1 | 1 | 0 | 0 | 0 | 0 | 1 | 1 | 1 | 1 | 1 | 1 | 1 | 1 | 0 | 0 | 0 | 0 |
| 61 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 |
| 62 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| 63 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

Table 1 - MLSA (Col 0) and the 31 Gold Sequences Corresponding to Presets $000000_2$ to $011111_2$

UNITED STATES PATENT AND TRADEMARK OFFICE

CERTIFICATE OF CORRECTION

PATENT NO. : 6,744,806 B1 
APPLICATION NO. : 09/660743
DATED : June 1, 2004
INVENTOR(S) : Michael Roy Moore, Stephen Fulton Smith and Michael Steven Emery It is certified that error appears in the above-identified patent and that said Letters Patent is hereby corrected as shown below:

Please insert the following first half of Table 2 at column 16 after line 14 and before line 15

| 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|
| 1 | 0 | 1 | [illegible] | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 |
| 0 | 1 | 1 | [illegible] | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 |
| 1 | 1 | 0 | [illegible] | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 0 |
| 0 | 1 | 0 | [illegible] | 1 | 0 | 1 | 0 | 1 | 0 | 1 | 0 | 0 | 1 | 0 | 1 | 0 | 1 | 0 | 1 | 1 | 0 | 1 | 0 | 1 | 0 | 1 | 0 | 0 | 1 | 0 | 1 | 0 |
| 1 | 0 | 0 | [illegible] | 1 | 0 | 0 | 1 | 0 | 1 | 1 | 0 | 0 | 1 | 1 | 0 | 0 | 1 | 1 | 0 | 0 | 1 | 1 | 0 | 1 | 0 | 0 | 1 | 1 | 0 | 0 | 1 | 0 |
| 1 | 0 | 0 | [illegible] | 0 | 1 | 1 | 0 | 1 | 0 | 0 | 1 | 0 | 1 | 1 | 0 | 0 | 1 | 1 | 0 | 1 | 0 | 0 | 1 | 0 | 1 | 1 | 0 | 1 | 0 | 0 | 1 | 0 |
| 0 | 0 | 1 | 1 | 1 | 1 | 0 | 0 | 1 | 1 | 0 | 0 | 0 | 0 | 1 | 1 | 0 | 0 | 1 | 1 | 1 | 1 | 0 | 0 | 1 | 1 | 0 | 0 | 0 | 0 | 1 | 1 | 0 |
| 1 | 1 | 1 | 1 | 0 | 0 | 0 | 0 | 0 | 0 | 0 | 0 | 1 | 1 | 1 | 1 | 0 | 0 | 0 | 0 | 1 | 1 | 1 | 1 | 1 | 1 | 1 | 1 | 0 | 0 | 0 | 0 | 0 |
| 1 | 0 | 1 | [illegible] | 1 | 0 | 1 | 0 | 0 | 1 | 0 | 1 | 0 | 1 | 0 | 1 | 0 | 1 | 0 | 1 | 0 | 1 | 0 | 1 | 1 | 0 | 1 | 0 | 1 | 0 | 1 | 0 | 1 |
| 1 | 0 | 0 | 1 | 1 | 0 | 0 | 1 | 1 | 0 | 0 | 1 | 1 | 0 | 0 | 1 | 0 | 1 | 1 | 0 | 0 | 1 | 1 | 0 | 0 | 1 | 1 | 0 | 0 | 1 | 1 | 0 | 1 |
| 0 | 0 | 1 | [illegible] | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 1 |
| 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 |
| 0 | 0 | 0 | [illegible] | 0 | 0 | 0 | 0 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 1 |
| 0 | 1 | 0 | 1 | 0 | 1 | 0 | 1 | 0 | 1 | 0 | 1 | 0 | 1 | 0 | 1 | 1 | 0 | 1 | 0 | 1 | 0 | 1 | 0 | 1 | 0 | 1 | 0 | 1 | 0 | 1 | 0 | 0 |
| 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 1 |
| 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 |
| 0 | 0 | 1 | 1 | 1 | 1 | 0 | 0 | 1 | 1 | 0 | 0 | 0 | 0 | 1 | 1 | 0 | 0 | 1 | 1 | 1 | 1 | 0 | 0 | 1 | 1 | 0 | 0 | 0 | 0 | 1 | 1 | 1 |
| 1 | 0 | 1 | 0 | 0 | 1 | 0 | 1 | 0 | 1 | 0 | 1 | 1 | 0 | 1 | 0 | 0 | 1 | 0 | 1 | 1 | 0 | 1 | 0 | 1 | 0 | 1 | 0 | 0 | 1 | 0 | 1 | 0 |
| 0 | 0 | 1 | 1 | 0 | 0 | 1 | 1 | 1 | 1 | 0 | 0 | 1 | 1 | 0 | 0 | 1 | 1 | 0 | 0 | 1 | 1 | 0 | 0 | 0 | 0 | 1 | 1 | 0 | 0 | 1 | 1 | 1 |
| 1 | 0 | 1 | 0 | 0 | 1 | 0 | 1 | 1 | 0 | 1 | 0 | 0 | 1 | 0 | 1 | 0 | 1 | 0 | 1 | 1 | 0 | 1 | 0 | 0 | 1 | 0 | 1 | 1 | 0 | 1 | 0 | 0 |
| 0 | 1 | 1 | 0 | 0 | 1 | 1 | 0 | 1 | 0 | 0 | 1 | 1 | 0 | 0 | 1 | 0 | 1 | 1 | 0 | 0 | 1 | 1 | 0 | 1 | 0 | 0 | 1 | 1 | 0 | 0 | 1 | 1 |
| 0 | 1 | 1 | 0 | 1 | 0 | 0 | 1 | 0 | 1 | 1 | 0 | 1 | 0 | 0 | 1 | 1 | 0 | 0 | 1 | 0 | 1 | 1 | 0 | 1 | 0 | 0 | 1 | 0 | 1 | 1 | 0 | 1 |
| 1 | 0 | 0 | [illegible] | 0 | 1 | 1 | 0 | 0 | 1 | 1 | 0 | 1 | 0 | 0 | 1 | 1 | 0 | 0 | 1 | 0 | 1 | 1 | 0 | 0 | 1 | 1 | 0 | 1 | 0 | 0 | 1 | 0 |
| 1 | 0 | 0 | 1 | 0 | 1 | 1 | 0 | 0 | 1 | 1 | 0 | 1 | 0 | 0 | 1 | 0 | 1 | 1 | 0 | 1 | 0 | 0 | 1 | 1 | 0 | 0 | 1 | 0 | 1 | 1 | 0 | 1 |
| 1 | 0 | 0 | 1 | 0 | 1 | 1 | 0 | 0 | 1 | 1 | 0 | 1 | 0 | 0 | 1 | 0 | 1 | 1 | 0 | 1 | 0 | 0 | 1 | 1 | 0 | 0 | 1 | 0 | 1 | 1 | 0 | 0 |
| 1 | 1 | 0 | 0 | 0 | 0 | 1 | 1 | 0 | 0 | 1 | 1 | 1 | 1 | 0 | 0 | 0 | 0 | 1 | 1 | 1 | 1 | 0 | 0 | 1 | 1 | 0 | 0 | 0 | 0 | 1 | 1 | 0 |
| 0 | 1 | 0 | 1 | 1 | 0 | 1 | 0 | 1 | 0 | 1 | 0 | 0 | 1 | 0 | 1 | 1 | 0 | 1 | 0 | 0 | 1 | 0 | 1 | 0 | 1 | 0 | 1 | 1 | 0 | 1 | 0 | 0 |
| 0 | 1 | 1 | [illegible] | 0 | 1 | 1 | 0 | 1 | 0 | 0 | 1 | 1 | 0 | 0 | 1 | 1 | 0 | 0 | 1 | 1 | 0 | 0 | 1 | 0 | 1 | 1 | 0 | 0 | 1 | 1 | 0 | 1 |
| 0 | 0 | 1 | 1 | 1 | 1 | 0 | 0 | 0 | 0 | 1 | 1 | 1 | 1 | 0 | 0 | 1 | 1 | 0 | 0 | 0 | 0 | 1 | 1 | 1 | 1 | 0 | 0 | 0 | 0 | 1 | 1 | 1 |
| 1 | 0 | 1 | 0 | 0 | 1 | 0 | 1 | 0 | 1 | 0 | 1 | 1 | 0 | 1 | 0 | 1 | 0 | 1 | 0 | 0 | 1 | 0 | 1 | 0 | 1 | 0 | 1 | 1 | 0 | 1 | 0 | 1 |
| 0 | 0 | 1 | [illegible] | 0 | 0 | 1 | 1 | 1 | 1 | 0 | 0 | 1 | 1 | 0 | 0 | 1 | 1 | 0 | 0 | 1 | 1 | 0 | 0 | 0 | 0 | 1 | 1 | 0 | 0 | 1 | 1 | 0 |

UNITED STATES PATENT AND TRADEMARK OFFICE
CERTIFICATE OF CORRECTION

PATENT NO. : 6,744,806 B1 
APPLICATION NO. : 09/660743
DATED : June 1, 2004
INVENTOR(S) : Michael Roy Moore, Stephen Fulton Smith and Michael Steven Emery It is certified that error appears in the above-identified patent and that said Letters Patent is hereby corrected as shown below:

Please insert the following second half of Table 2 at column 16 after line 14 and before line 15

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 1 | 1 | 1 | 1 | 0 | 0 | 0 | 0 | 1 | 1 | 1 | 1 | 0 | 0 | 0 | 0 | 0 | 0 | 0 | 0 | 1 | 1 | 1 | 1 | 0 | 0 | 0 | 0 | 1 | 1 | 1 | 1 | 1 |
| 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 |
| 0 | 1 | 0 | 1 | 0 | 1 | 0 | 1 | 0 | 1 | 0 | 1 | 0 | 1 | 0 | 1 | 1 | 0 | 1 | 0 | 1 | 0 | 1 | 0 | 1 | 0 | 1 | 0 | 1 | 0 | 1 | 0 | 1 |
| 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 |
| 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 |
| 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 |
| 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 |
| 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 1 |
| 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 |
| 0 | 1 | 1 | 0 | 0 | 1 | 1 | 0 | 1 | 0 | 0 | 1 | 1 | 0 | 0 | 1 | 0 | 1 | 1 | 0 | 0 | 1 | 1 | 0 | 1 | 0 | 0 | 1 | 1 | 0 | 0 | 1 | 1 |
| 1 | 1 | 0 | 0 | 0 | 0 | 1 | 1 | 1 | 1 | 0 | 0 | 0 | 0 | 1 | 1 | 0 | 0 | 1 | 1 | 1 | 1 | 0 | 0 | 0 | 0 | 1 | 1 | 1 | 1 | 0 | 0 | 1 |
| 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 0 |
| 0 | 1 | 0 | 1 | 0 | 1 | 0 | 1 | 1 | 0 | 1 | 0 | 1 | 0 | 1 | 0 | 1 | 0 | 1 | 0 | 1 | 0 | 1 | 0 | 0 | 1 | 0 | 1 | 0 | 1 | 0 | 1 | 1 |
| 1 | 1 | 0 | 0 | 1 | 1 | 0 | 0 | 1 | 1 | 0 | 0 | 1 | 1 | 0 | 0 | 0 | 0 | 1 | 1 | 0 | 0 | 1 | 1 | 0 | 0 | 1 | 1 | 0 | 0 | 1 | 1 | 0 |
| 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 |
| 1 | 1 | 0 | 0 | 1 | 1 | 0 | 0 | 0 | 0 | 1 | 1 | 0 | 0 | 1 | 1 | 1 | 1 | 0 | 0 | 1 | 1 | 0 | 0 | 0 | 0 | 1 | 1 | 0 | 0 | 1 | 1 | 0 |
| 0 | 1 | 0 | 1 | 1 | 0 | 1 | 0 | 0 | 1 | 0 | 1 | 1 | 0 | 1 | 0 | 1 | 0 | 1 | 0 | 0 | 1 | 0 | 1 | 1 | 0 | 1 | 0 | 0 | 1 | 0 | 1 | 1 |
| 1 | 1 | 0 | 0 | 1 | 1 | 0 | 0 | 0 | 0 | 1 | 1 | 0 | 0 | 1 | 1 | 1 | 1 | 0 | 0 | 1 | 1 | 0 | 0 | 0 | 0 | 1 | 1 | 0 | 0 | 1 | 1 | 1 |
| 0 | 0 | 0 | 0 | 1 | 1 | 1 | 1 | 0 | 0 | 0 | 0 | 1 | 1 | 1 | 1 | 1 | 1 | 1 | 1 | 0 | 0 | 0 | 0 | 1 | 1 | 1 | 1 | 0 | 0 | 0 | 0 | 0 |
| 1 | 0 | 1 | 0 | 1 | 0 | 1 | 0 | 0 | 1 | 0 | 1 | 0 | 1 | 0 | 1 | 1 | 0 | 1 | 0 | 1 | 0 | 1 | 0 | 0 | 1 | 0 | 1 | 0 | 1 | 0 | 1 | 1 |
| 1 | 1 | 0 | 0 | 1 | 1 | 0 | 0 | 1 | 1 | 0 | 0 | 1 | 1 | 0 | 0 | 0 | 0 | 1 | 1 | 0 | 0 | 1 | 1 | 0 | 0 | 1 | 1 | 0 | 0 | 1 | 1 | 0 |
| 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 |
| 0 | 1 | 0 | 1 | 0 | 1 | 0 | 1 | 1 | 0 | 1 | 0 | 1 | 0 | 1 | 0 | 0 | 1 | 0 | 1 | 0 | 1 | 0 | 1 | 1 | 0 | 1 | 0 | 1 | 0 | 1 | 0 | 0 |
| 0 | 1 | 1 | 0 | 0 | 1 | 1 | 0 | 0 | 1 | 1 | 0 | 0 | 1 | 1 | 0 | 1 | 0 | 0 | 1 | 1 | 0 | 0 | 1 | 1 | 0 | 0 | 1 | 1 | 0 | 0 | 1 | 0 |
| 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 1 | 0 | 0 | 1 | 0 | 1 | 1 | 0 | 0 |
| 0 | 1 | 1 | 0 | 1 | 0 | 0 | 1 | 1 | 0 | 0 | 1 | 0 | 1 | 1 | 0 | 0 | 1 | 1 | 0 | 1 | 0 | 0 | 1 | 1 | 0 | 0 | 1 | 0 | 1 | 1 | 0 | 0 |
| 1 | 1 | 0 | 0 | 0 | 0 | 1 | 1 | 0 | 0 | 1 | 1 | 1 | 1 | 0 | 0 | 0 | 0 | 1 | 1 | 1 | 1 | 0 | 0 | 1 | 1 | 0 | 0 | 0 | 0 | 1 | 1 | 1 |
| 0 | 0 | 0 | 0 | 1 | 1 | 1 | 1 | 1 | 1 | 1 | 1 | 0 | 0 | 0 | 0 | 1 | 1 | 1 | 1 | 0 | 0 | 0 | 0 | 0 | 0 | 0 | 0 | 1 | 1 | 1 | 1 | 1 |
| 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

Table 2 - 33 Gold Sequences Corresponding to Presets $100000_2$ to $111111_2$

Signed and Sealed this

Eighth Day of July, 2008

JON W. DUDAS
*Director of the United States Patent and Trademark Office*